United States Patent
Song et al.

(10) Patent No.: US 9,788,327 B2
(45) Date of Patent: Oct. 10, 2017

(54) METHODS AND APPARATUS FOR REDUCING INTERFERENCE IN A HETEROGENEOUS NETWORK

(71) Applicant: QUALCOMM Incorporated, San Diego, CA (US)

(72) Inventors: Osok Song, San Diego, CA (US); Madhavan S. Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 13/675,110

(22) Filed: Nov. 13, 2012

(65) Prior Publication Data

US 2013/0121191 A1    May 16, 2013

Related U.S. Application Data

(60) Provisional application No. 61/559,343, filed on Nov. 14, 2011, provisional application No. 61/578,783, filed on Dec. 21, 2011.

(51) Int. Cl.
*H04W 72/08* (2009.01)
*H04W 24/10* (2009.01)
(Continued)

(52) U.S. Cl.
CPC ....... *H04W 72/082* (2013.01); *H04J 11/0056* (2013.01); *H04L 5/0053* (2013.01);
(Continued)

(58) Field of Classification Search
None
See application file for complete search history.

(56) References Cited

U.S. PATENT DOCUMENTS

2010/0008282 A1  1/2010 Bhattad et al.
2011/0065493 A1  3/2011 Parham
(Continued)

FOREIGN PATENT DOCUMENTS

EP   2219302 A1   8/2010
JP   2011223113 A  11/2011
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP Standard; 3GPP TS 36.300, 3rd Generation Partnership Project (3GPP), Mobile Competence Centre ; 650, Route Des Lucioles ; F-06921 Sophia-Antipolis Cedex; France, vol. RAN WG2, No. V10.5.0, Sep. 28, 2011 (Sep. 28, 2011), pp. 1-194, XP050554206, [retrieved on Sep. 28, 2011].
(Continued)

*Primary Examiner* — Ayaz Sheikh
*Assistant Examiner* — Sori Aga
(74) *Attorney, Agent, or Firm* — Patterson & Sheridan, L.L.P.

(57) ABSTRACT

Certain aspects relate to methods and apparatus for reducing interference in a heterogeneous network. Certain aspects relate to methods and apparatus for delinking downlink and uplink resource partitioning in a heterogeneous network. In aspects, the delinking is accomplished by reliably delivering uplink grant to a UE, e.g., pico UE in a pico CRE region, without using downlink Almost Blank Subframe (ABS) resources in which an interfering cell limits transmission to reduce interference to other victim cells. In techniques, instead of using the regular PDCCH sent in downlink ABS resources for uplink grant transmission, the uplink grant is
(Continued)

sent on another more reliable downlink control channel using resources configured to avoid interference with transmissions from an interfering base station. In techniques, the DL grant is sent on PDCCH in non-downlink ABS resources, but the UE employs enhanced UE capabilities (e.g., interference cancellation) to process the received control information.

93 Claims, 14 Drawing Sheets

(51) Int. Cl.
    *H04W 36/08*     (2009.01)
    *H04L 5/00*     (2006.01)
    *H04J 11/00*     (2006.01)
    *H04W 72/12*     (2009.01)
    *H04W 72/04*     (2009.01)

(52) U.S. Cl.
    CPC ........... *H04L 5/0073* (2013.01); *H04W 24/10* (2013.01); *H04W 36/08* (2013.01); *H04W 72/1289* (2013.01); *H04L 5/0007* (2013.01); *H04W 72/0406* (2013.01)

(56) References Cited

U.S. PATENT DOCUMENTS

| | | | |
|---|---|---|---|
| 2011/0170496 A1 | 7/2011 | Fong et al. | |
| 2011/0201341 A1 | 8/2011 | Choudhury et al. | |
| 2011/0249642 A1 | 10/2011 | Song et al. | |
| 2011/0255468 A1 | 10/2011 | Vajapeyam et al. | |
| 2011/0306347 A1 | 12/2011 | Choi et al. | |
| 2012/0015664 A1 | 1/2012 | Han | |
| 2012/0127954 A1* | 5/2012 | Lim et al. | 370/330 |
| 2012/0213189 A1 | 8/2012 | Choi et al. | |
| 2013/0084865 A1* | 4/2013 | Agrawal | H04W 36/0083 455/436 |
| 2013/0286906 A1* | 10/2013 | Seo | H04W 72/0426 370/280 |
| 2013/0343241 A1* | 12/2013 | Niu | H04B 15/00 370/280 |
| 2014/0086203 A1* | 3/2014 | Furuskar | H04W 52/143 370/330 |
| 2014/0153535 A1* | 6/2014 | Lei et al. | 370/329 |

FOREIGN PATENT DOCUMENTS

| | | |
|---|---|---|
| JP | 2014518032 A | 7/2014 |
| KR | 20120024497 A | 3/2012 |
| WO | WO-2009120934 A1 | 10/2009 |
| WO | WO-2010006285 A2 | 1/2010 |
| WO | WO-2011002110 A1 | 1/2011 |
| WO | WO-2011065493 A1 | 6/2011 |
| WO | WO-2011093095 A1 | 8/2011 |
| WO | WO-2011119765 A1 | 9/2011 |
| WO | WO-2011122833 A2 | 10/2011 |
| WO | WO-2011130447 A1 | 10/2011 |
| WO | WO-2012148338 A1 | 11/2012 |

OTHER PUBLICATIONS

International Search Report and Written Opinion—PCT/US2012/064924—ISA/EPO—Apr. 2, 2013.
Nokia Corporation et al: "On Resource Partitioning Between Macro and HeNBs," 3GPP Draft, R4-102978, Mobile Competence Centre, F-06921 Sophia-Antipolis Cedex, vol. RAN WG4, No. Madrid, Spain, Aug. 17, 2010, XP050454088, 10 pages.
Nokia Siemens Networks, Nokia: "Potential for uplink capacity enhancement when applying Tom eiCIC," Discussion and Decision, R1-112383, 3GPP TSG RAN WG1 #66 Meeting, Athens, Greece, Aug. 22-26, 2011, XP050537507, 2 pages.
Partial International Search Report—PCT/US2012/064924—ISA/EPO—Feb. 22, 2013.
Samsung: "CRS interference cancellation in HetNet scenarios for UE performance," 3GPP Draft, R1-112507 CRS Interference Cancellation in Hetnet, Mobile Competence Centre, F-06921 Sophia-Antipolis Cedex, vol. RAN WG1, No. Athens, Greece, Aug. 16, 2011, XP050537592, 4 pages.
European Search Report—EP15156287—Search Authority—The Hague—Jun. 18, 2015.
European Search Report—EP15156289—Search Authority—The Hague—Jun. 11, 2015.

\* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

METHODS AND APPARATUS FOR REDUCING INTERFERENCE IN A HETEROGENEOUS NETWORK

The present application for patent claims priority to U.S. Provisional Application No. 61/559,343, entitled "METHODS AND APPARATUS FOR HANDLING UPLINK INTERFERENCE IN A HETEROGENEOUS NETWORK," filed Nov. 14, 2011, and U.S. Provisional Application No. 61/578,783, entitled "METHODS AND APPARATUS FOR DECOUPLING DOWNLINK AND UPLINK RESOURCE PARTITIONING IN HETEROGENEOUS NETWORKS," filed Dec. 21, 2011, and assigned to the assignee hereof and hereby expressly incorporated by reference herein.

BACKGROUND

Field

Certain aspects of the present disclosure generally relate to wireless communications and, more specifically, to methods and apparatus for reducing interference in a heterogeneous network.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from one or more neighbor base stations. On the uplink, a transmission from the UE may cause interference to transmissions from one or more other UEs communicating with the one or more neighbor base stations. The interference may degrade performance on both the downlink and uplink.

SUMMARY

Certain aspects of the present disclosure provide a method for wireless communications by a user equipment (UE). The method generally includes receiving, from a serving base station, an assignment of downlink resources on one or more special downlink subframes in which an interfering base station limits downlink transmissions in an effort to reduce interference to another station, receiving, from the serving base station, an assignment of uplink resources on one or more downlink subframes that are not limited to the special downlink subframes, and transmitting to the serving base station, using the assigned uplink resources.

Certain aspects of the present disclosure provide an apparatus for wireless communications. The apparatus generally includes means for receiving, from a serving base station, an assignment of downlink resources on one or more special downlink subframes in which an interfering base station limits downlink transmissions in an effort to reduce interference to another station, means for receiving, from the serving base station, an assignment of uplink resources on one or more downlink subframes that are not limited to the special downlink subframes, and means for transmitting to the serving base station, using the assigned uplink resources.

Certain aspects of the present disclosure provide an apparatus for wireless communication. The apparatus generally includes at least one processor and a memory coupled to the at least one processor. The processor is generally configured to receive, from a serving base station, an assignment of downlink resources on one or more special downlink subframes in which an interfering base station limits downlink transmissions in an effort to reduce interference to another station, receive, from the serving base station, an assignment of uplink resources on one or more downlink subframes that are not limited to the special downlink subframes, and transmit to the serving base station, using the assigned uplink resources.

Certain aspects of the present disclosure provide a computer program product for wireless communications. The computer program product generally includes a computer-readable medium comprising instructions for receiving, from a serving base station, an assignment of downlink resources on one or more special downlink subframes in which an interfering base station limits downlink transmissions in an effort to reduce interference to another station, receiving, from the serving base station, an assignment of uplink resources on one or more downlink subframes that are not limited to the special downlink subframes, and transmitting to the serving base station, using the assigned uplink resources.

Certain aspects of the present disclosure provide a method for wireless communications by a serving base station. The method generally includes transmitting, from the serving base station, an assignment of downlink resources on one or more special subframes in which an interfering base station limits downlink transmissions in an effort to reduce interference to another station, transmitting, from the serving base station, an assignment of uplink resources on one or more downlink subframes that are not limited to the special downlink subframes, and receiving at the serving base station, using the assigned uplink resources.

Certain aspects of the present disclosure provide an apparatus for wireless communications. The apparatus generally includes means for transmitting, from a serving base station, an assignment of downlink resources on one or more special subframes in which an interfering base station limits downlink transmissions in an effort to reduce interference to another station, means for transmitting, from the serving base station, an assignment of uplink resources on one or more downlink subframes that are not limited to the special downlink subframes, and means for receiving at the serving base station, using the assigned uplink resources.

Certain aspects of the present disclosure provide an apparatus for wireless communication. The apparatus generally includes at least one processor and a memory coupled to the at least one processor. The processor is generally configured to transmit, from a serving base station, an assignment of downlink resources on one or more special subframes in which an interfering base station limits downlink transmissions in an effort to reduce interference to another station, transmit, from the serving base station, an assignment of uplink resources on one or more downlink subframes that are not limited to the special downlink subframes, and receive at the serving base station, using the assigned uplink resources.

Certain aspects of the present disclosure provide a computer program product for wireless communications. The computer program product generally includes a computer-readable medium comprising instructions for transmitting, from a serving base station, an assignment of downlink resources on one or more special subframes in which an interfering base station limits downlink transmissions in an effort to reduce interference to another station, transmitting, from the serving base station, an assignment of uplink resources on one or more downlink subframes that are not limited to the special downlink subframes, and receiving at the serving base station, using the assigned uplink resources.

Certain aspects of the present disclosure provide a method for wireless communications by an interfering base station. The method generally includes identifying a set of one or more user equipments (UEs) served by a interfering base station (BS) whose uplink (UL) transmissions may interfere with UL transmissions from one or more other UEs served by a serving BS, reserving a set of resources for use by the set of one or more UEs, and communicating the reserved set of resources to the serving BS.

Certain aspects of the present disclosure provide an apparatus for wireless communications. The apparatus generally includes means for identifying a set of one or more user equipments (UEs) served by an interfering base station (BS) whose uplink (UL) transmissions may interfere with UL transmissions from one or more other UEs served by a serving BS, means for reserving a set of resources for use by the set of one or more UEs, and means for communicating the reserved set of resources to the serving BS.

Certain aspects of the present disclosure provide an apparatus for wireless communication. The apparatus generally includes at least one processor and a memory coupled to the at least one processor. The processor is generally configured to identify a set of one or more user equipments (UEs) served by an interfering base station (BS) whose uplink (UL) transmissions may interfere with UL transmissions from one or more other UEs served by a serving BS, reserve a set of resources for use by the set of one or more UEs, and communicate the reserved set of resources to the serving BS.

Certain aspects of the present disclosure provide a computer program product for wireless communications. The computer program product generally includes a computer-readable medium comprising instructions for identifying a set of one or more user equipments (UEs) served by a interfering base station (BS) whose uplink (UL) transmissions may interfere with UL transmissions from one or more other UEs served by a serving BS, reserving a set of resources for use by the set of one or more UEs, and communicating the reserved set of resources to the serving BS.

Certain aspects of the present disclosure provide a method for wireless communications by a serving base station (BS). The method generally includes detecting, one or more User Equipments (UEs) served by an interfering BS whose uplink (UL) transmissions may interfere with UL transmissions from one or more other UEs served by the serving BS, sending an indication of the detected one or more UEs to the interfering BS. In aspects, the method may include receiving, from the interfering BS, an indication of resources reserved for UL transmissions by the one or more UEs served by the interfering BS.

Certain aspects of the present disclosure provide an apparatus for wireless communications. The apparatus generally includes means for detecting, one or more User Equipments (UEs) served by an interfering BS whose uplink (UL) transmissions may interfere with UL transmissions from one or more other UEs served by a serving BS, means for sending an indication of the detected one or more UEs to the interfering BS. In aspects, the apparatus may include means for receiving, from the interfering BS, an indication of resources reserved for UL transmissions by the one or more UEs served by the interfering BS.

Certain aspects of the present disclosure provide an apparatus for wireless communication. The apparatus generally includes at least one processor and a memory coupled to the at least one processor. The processor is generally configured to detect, one or more User Equipments (UEs) served by an interfering BS whose uplink (UL) transmissions may interfere with UL transmissions from one or more other UEs served by a serving BS, send an indication of the detected one or more UEs to the interfering BS. In aspects, the processor may be configured to receive, from the interfering BS, an indication of resources reserved for UL transmissions by the one or more UEs served by the interfering BS.

Certain aspects of the present disclosure provide a computer program product for wireless communications. The computer program product generally includes a computer-readable medium comprising instructions for detecting, one or more User Equipments (UEs) served by an interfering BS whose uplink (UL) transmissions may interfere with UL transmissions from one or more other UEs served by a serving BS, sending an indication of the detected one or more UEs to the interfering BS. In aspects, the computer-readable medium may include instructions for receiving, from the interfering BS, an indication of resources reserved for UL transmissions by the one or more UEs served by the interfering BS.

Certain aspects of the present disclosure provide a method for wireless communications. The method generally includes receiving, from a serving base station, an assignment of uplink resources, wherein the assigned uplink resources are not limited to resources having a fixed time offset relative to special subframes in which an interfering base station limits downlink transmissions in an effort to reduce interference to another station, and transmitting to the serving base station, using the assigned uplink resources.

Certain aspects of the present disclosure provide an apparatus for wireless communications. The apparatus generally includes means for receiving, from a serving base station, an assignment of uplink resources, wherein the assigned uplink resources are not limited to resources having a fixed time offset relative to special subframes in which an interfering base station limits downlink transmissions in an effort to reduce interference to another station, and means for transmitting to the serving base station, using the assigned uplink resources.

Certain aspects of the present disclosure provide an apparatus for wireless communication. The apparatus generally includes at least one processor and a memory coupled to the at least one processor. The processor is generally configured to receive, from a serving base station, an assignment of uplink resources, wherein the assigned uplink resources are not limited to resources having a fixed time offset relative to special subframes in which an interfering base station limits downlink transmissions in an effort to reduce interference to another station, and transmit to the serving base station, using the assigned uplink resources.

Certain aspects of the present disclosure provide a computer program product for wireless communications. The computer program product generally includes a computer-readable medium comprising instructions for receiving, from a serving base station, an assignment of uplink resources, wherein the assigned uplink resources are not limited to resources having a fixed time offset relative to special subframes in which an interfering base station limits downlink transmissions in an effort to reduce interference to another station, and transmitting to the serving base station, using the assigned uplink resources.

Certain aspects of the present disclosure provide a method for wireless communications. The method generally includes transmitting, from a serving base station, an assignment of uplink resources, wherein the assigned uplink resources are not limited to resources having a fixed time offset relative to special subframes in which an interfering base station limits downlink transmissions in an effort to reduce interference to another station, and receiving at the serving base station, using the assigned uplink resources.

Certain aspects of the present disclosure provide an apparatus for wireless communications. The apparatus generally includes means for transmitting, from a serving base station, an assignment of uplink resources, wherein the assigned uplink resources are not limited to resources having a fixed time offset relative to special subframes in which an interfering base station limits downlink transmissions in an effort to reduce interference to another station, and means for receiving at the serving base station, using the assigned uplink resources.

Certain aspects of the present disclosure provide an apparatus for wireless communication. The apparatus generally includes at least one processor and a memory coupled to the at least one processor. The processor is generally configured to transmit, from a serving base station, an assignment of uplink resources, wherein the assigned uplink resources are not limited to resources having a fixed time offset relative to special subframes in which an interfering base station limits downlink transmissions in an effort to reduce interference to another station, and receive at the serving base station, using the assigned uplink resources.

Certain aspects of the present disclosure provide a computer program product for wireless communications. The computer program product generally includes a computer-readable medium comprising instructions for transmitting, from a serving base station, an assignment of uplink resources, wherein the assigned uplink resources are not limited to resources having a fixed time offset relative to special subframes in which an interfering base station limits downlink transmissions in an effort to reduce interference to another station, and receiving at the serving base station, using the assigned uplink resources.

Numerous other aspects are provided including apparatus, systems and computer program products. Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
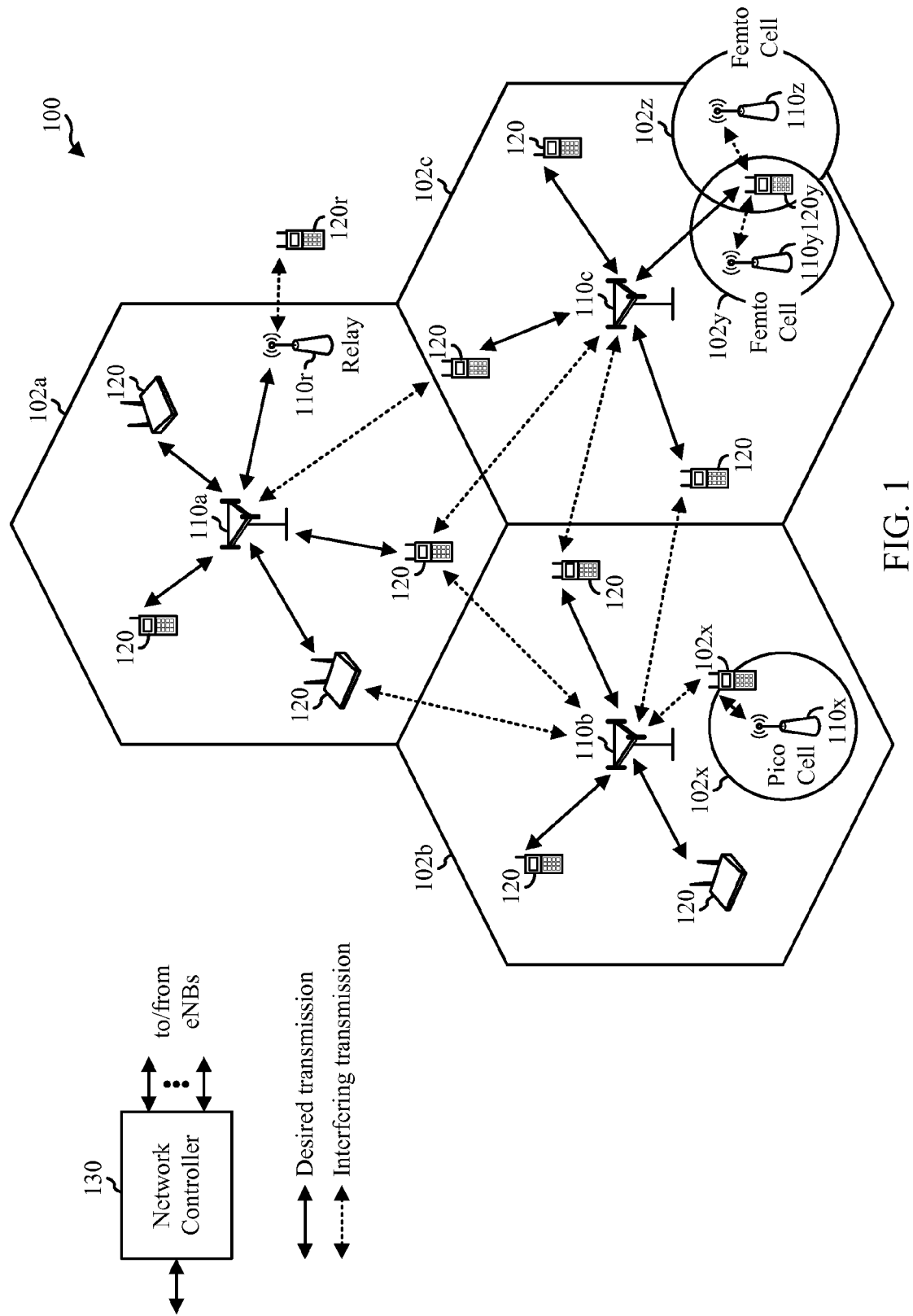
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
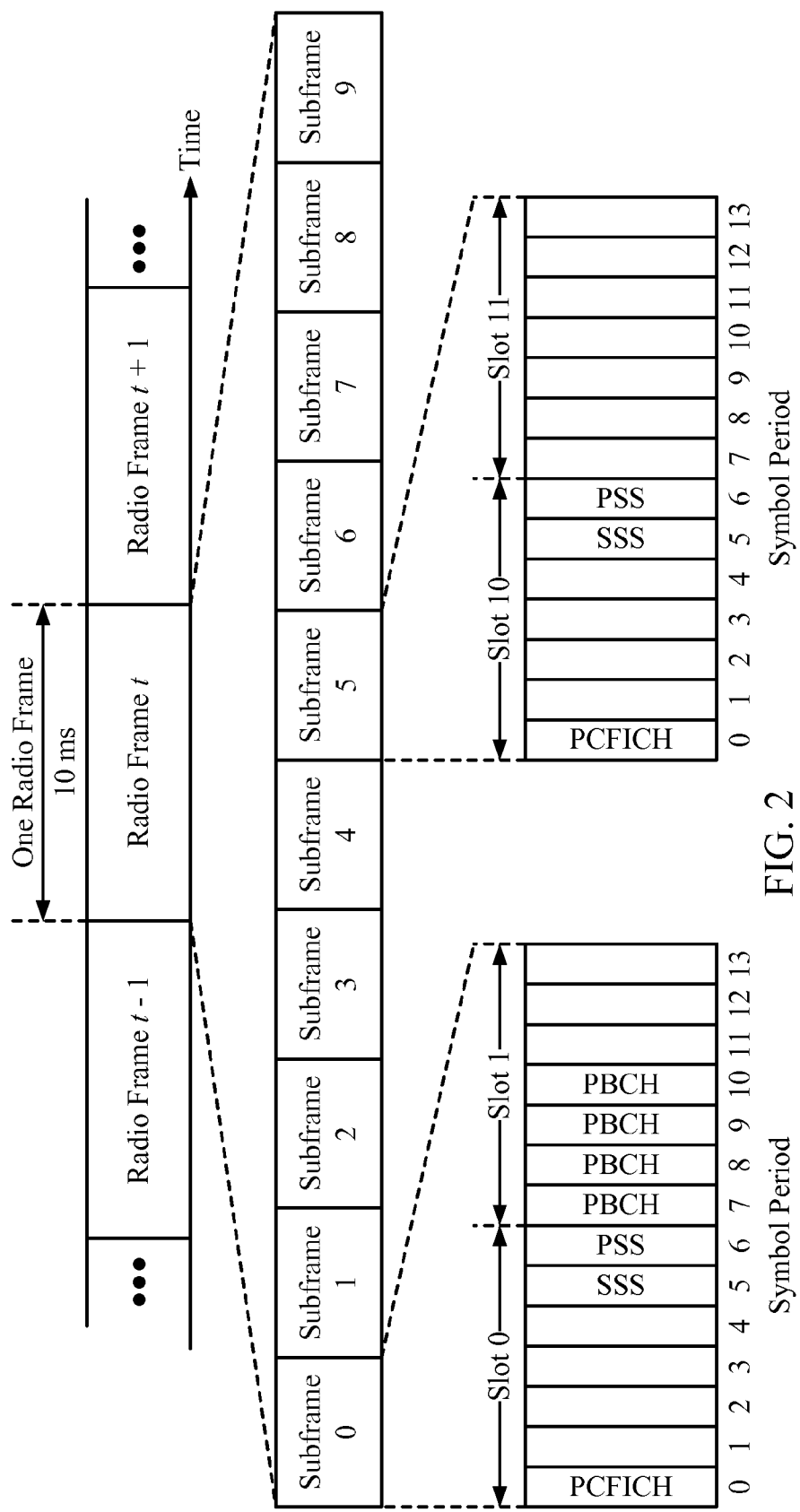
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PD-CCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
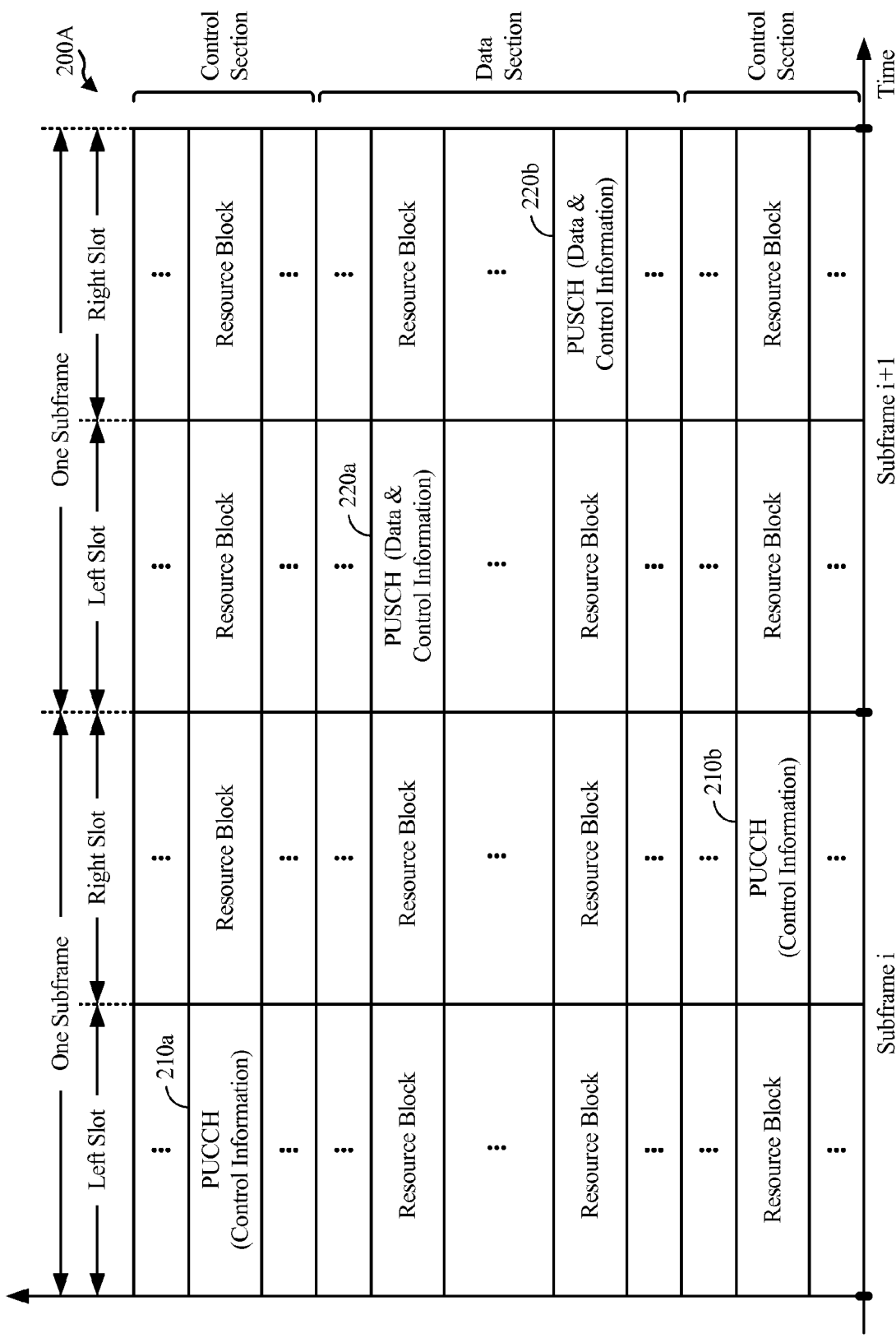
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
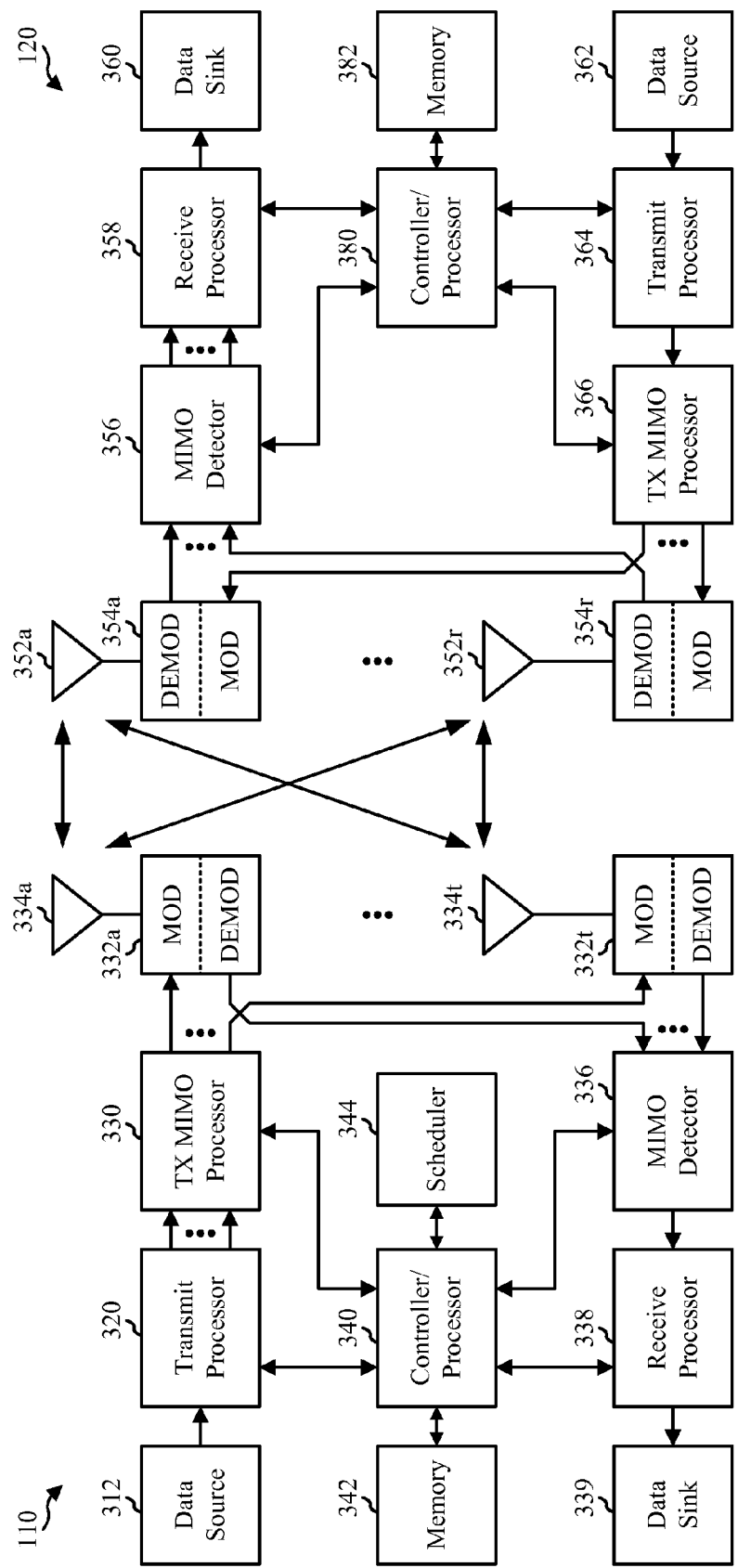
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations for blocks 800 in FIG. 8, and/or other processes for the techniques described herein. Similarly, the controller/processor 340 and/or other processors and modules at the eNB 110 may perform or direct operations for blocks 900 in FIG. 9, and/or other processes for the techniques described herein.

The memories 342 and 382 may store data and program codes for base station 110 and UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce or eliminate interference by the interfering cell's giving up part of its resources. Using eICIC or similar techniques, a UE may access a serving cell using the resources yielded by the interfering cell, where otherwise the UE would experience severe interference.

For example, a femto cell with a closed access mode (e.g., only a member femto UE can access the cell) in an open macro cell's coverage can create a coverage hole for a macro cell. By making a femto cell give up some of its resources, the macro UE under the femto cell coverage area can access the UE's serving macro cell by using the resources yielded by a femto cell.

In a radio access system using OFDM, such as E-UTRAN, the resources yielded by the interfering cell may be time-based, frequency-based, or a combination of both. When the yielded resources are time-based, the interfering cell does not use some of the subframes in the time domain. When the yielded resources are frequency-based, the interfering cell does not use some of the subcarriers in the frequency domain. When the yielded resources are a combination of both frequency and time, the interfering cell does not use certain resources defined by frequency and time.

Figure 4:
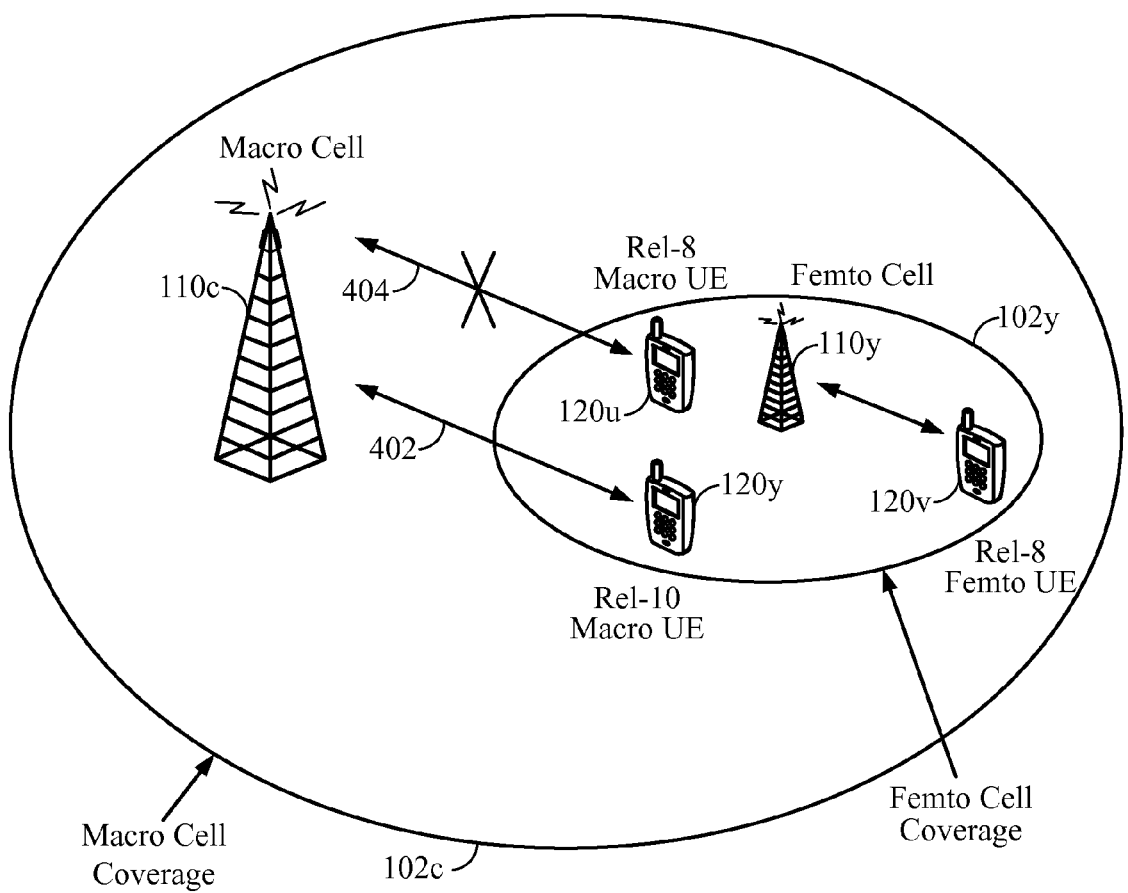
FIG. 4 illustrates an example heterogeneous network in accordance with certain aspects of the present disclosure.

FIG. 4 illustrates an example scenario where eICIC may allow the macro UE 120y supporting eICIC (e.g., a Rel-10 macro UE as shown in FIG. 4) to access the macro cell 110c even when the macro UE 120y is experiencing severe interference from the femto cell 110y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

According to certain aspects, the resource partitioning between base stations may be done time based. As an example, for E-UTRAN, resources may be partitioned by subframes.

According to certain aspects, networks may support enhanced interference coordination, where there may be different sets of partitioning information. A first of these may be referred to as Semi-static Resource Partitioning Information (SRPI). A second of these sets may be referred to as Adaptive Resource Partitioning Information (ARPI). As the name implies, SRPI typically does not change frequently, and SRPI may be sent to the UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For the downlink (e.g., from an eNB to a UE), the partitioning pattern may be mapped to a known subframe (e.g., a first subframe of each radio frame that has a system frame number (SFN) value that is a multiple of an integer N, such as multiples of 4). Such a mapping may be applied in order to determine resource partitioning information for a specific subframe. As an example, a subframe that is subject to coordinated resource partitioning (e.g., yielded by an interfering cell) for the downlink may be identified by an index:

IndexSRPI_DL=(SFN*10+subframe number) mod 8

For the uplink, the SRPI mapping may be shifted, for example, by 4 ms. Thus, an example for the uplink may be:

IndexSRPI_UL=(SFN*10+subframe number+4) mod 8

SRPI may use the following three values for each entry:

U (Use): this value indicates the subframe has been cleaned up from the dominant interference to be used by this cell (i.e., the main interfering cells do not use this subframe);

N (No Use): this value indicates the subframe shall not be used; and

X (Unknown): this value indicates the subframe is not statically partitioned. Details of resource usage negotiation between base stations are not known to the UE.

Another possible set of parameters for SRPI may be the following:

U (Use): this value indicates the subframe has been cleaned up from the dominant interference to be used by this cell (i.e., the main interfering cells do not use this subframe);

N (No Use): this value indicates the subframe shall not be used;

X (Unknown): this value indicates the subframe is not statically partitioned (and details of resource usage negotiation between base stations are not known to the UE); and C (Common): this value may indicate all cells may use this subframe without resource partitioning. This subframe may be subject to interference, so that the base station may choose to use this subframe only for a UE that is not under severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g., macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identities (PCIs).

ARPI may represent further resource partitioning information with the detailed information for the 'X' subframes in SRPI. As noted above, detailed information for the 'X' subframes is typically only known to the base stations.

Figure 6:
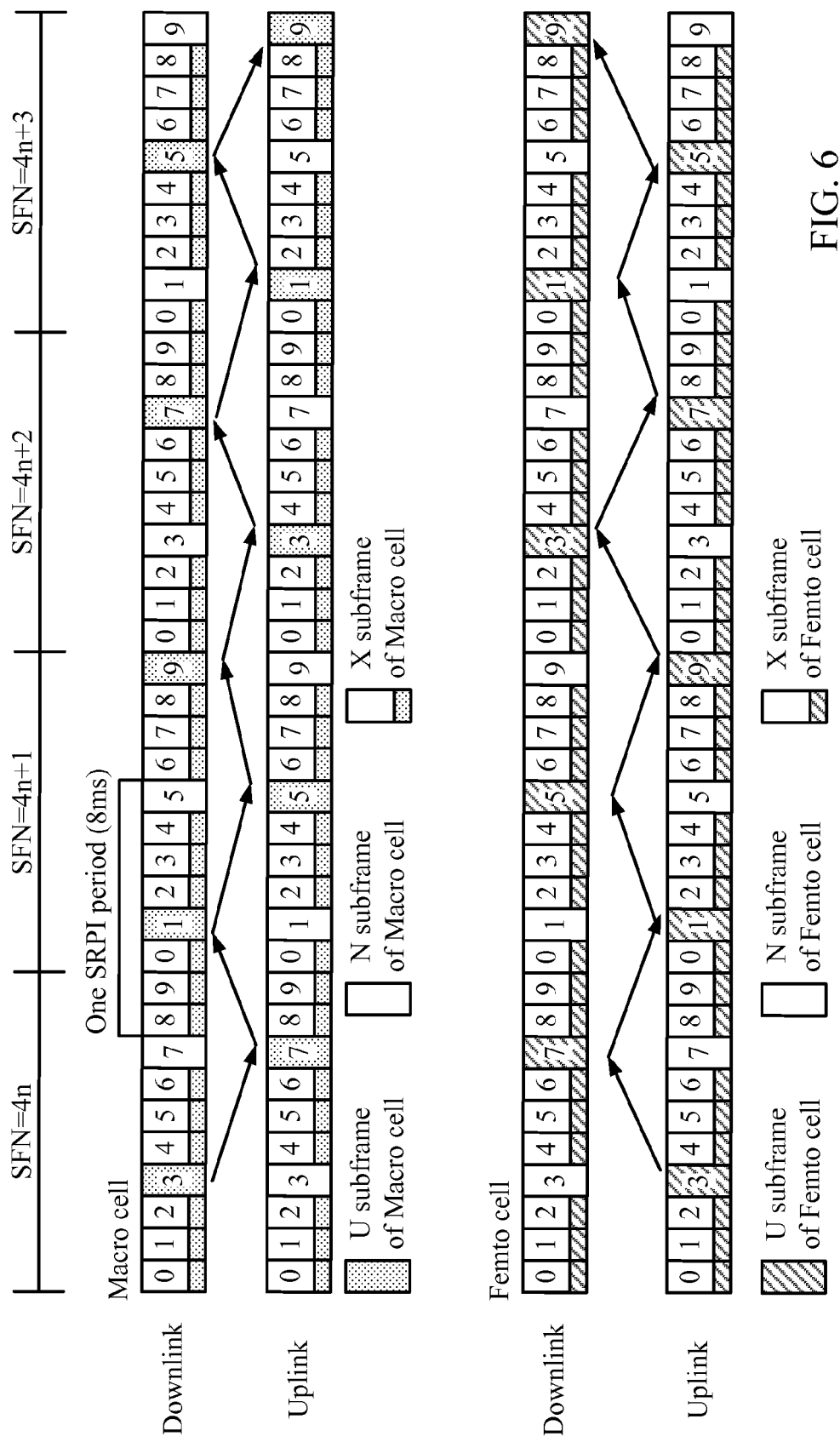
FIG. 6 illustrates example cooperative partitioning of subframes in a heterogeneous network in accordance with certain aspects of the present disclosure.

FIG. 5 and FIG. 6 illustrate examples of SRPI assignment as described above in the scenario with macro and femto cells. A U, N, X, or C subframe is a subframe corresponding to a U, N, X, or C SRPI assignment.

Example Methods and Apparatus for Reducing Interference in a Heterogeneous Network As discussed in the previous section, eICIC is a technique that allows cells belonging to different power classes, for example, to coexist and share resources in a heterogeneous network. For example, eICIC may allow a UE to receive service from a cell that is not the strongest cell in the vicinity of the UE. In an aspect, this may allow offload from macro cells to relatively low power pico cells.

In certain aspects, the eICIC technique may include an aggressor cell eNB (e.g., macro cell eNB) generating certain special subframes (e.g., uplink or downlink subframes) in which the macro eNB limits transmissions in an effort to reduce interference to other cells/base stations in the macro cell's vicinity. For example, the stronger macro cell may generate almost blank subframes (ABS) (e.g., U subframes in FIG. 6), allowing signals of a weaker cell (e.g., pico cell) to be received at the UE using the ABS resources.

In certain aspects, the pattern of the ABS of an aggressor cell (e.g. macro cell) is typically shared with the eNBs of the victim cells so that a victim eNB (e.g. pico eNB) may serve one or more UEs with this ABS resource, e.g., in a cell range expansion (CRE) area where interference is especially severe. For example, in a heterogeneous network including a macro cell and pico cell (macro-pico case), the ABS may be created by the macro cell, and the macro cell may inform resource partitioning information including information regarding the ABS resources to the pico cell. The ABS resources may then be used by the pico cell to serve UEs for which the pico cell is not the strongest cell, for example, UEs in the CRE region.

In LTE Release 10, the ABS is currently defined for downlink (DL) traffic. In certain aspects, for example in LTE Frequency Division Duplex (FDD), when the ABS pattern for the downlink is determined, a straightforward application of the ABS pattern for the uplink (UL) traffic is to use the same downlink ABS pattern with 4 ms offset. The reason is that the UEs in the CRE area may need to receive the PDCCH having the uplink grant/scheduling (including UL ABS pattern) on the DL ABS. Thus, in certain aspects, the UL transmission is 4 ms after the UL grant reception.

This creates a tight linkage between the DL ABS pattern and the UL ABS pattern. But, in certain aspects, the interference condition for a UE on the UL in HetNet may be quite distinct from the interference condition on the DL, for example, a pico UE in the CRE area (which may experience strong DL interference from macro cells) may still have smaller path loss to the pico cell than to a macro cell and experience considerably lesser interference on the UL. On the other hand, a pico UE may experience more interference on the UL as compared to on the DL, for example, because of one or more macro UEs in its vicinity that cannot be handed over to the pico UE (e.g., legacy UEs) and have smaller path loss to the pico eNB than their serving macro eNB. Thus, in cases where the UL interference pattern is significantly different from the DL interference pattern, a UL ABS pattern similar to the DL ABS pattern may not help efficient UL transmissions, for example, between a pico eNB and a victim pico UEs.

Figure 7:
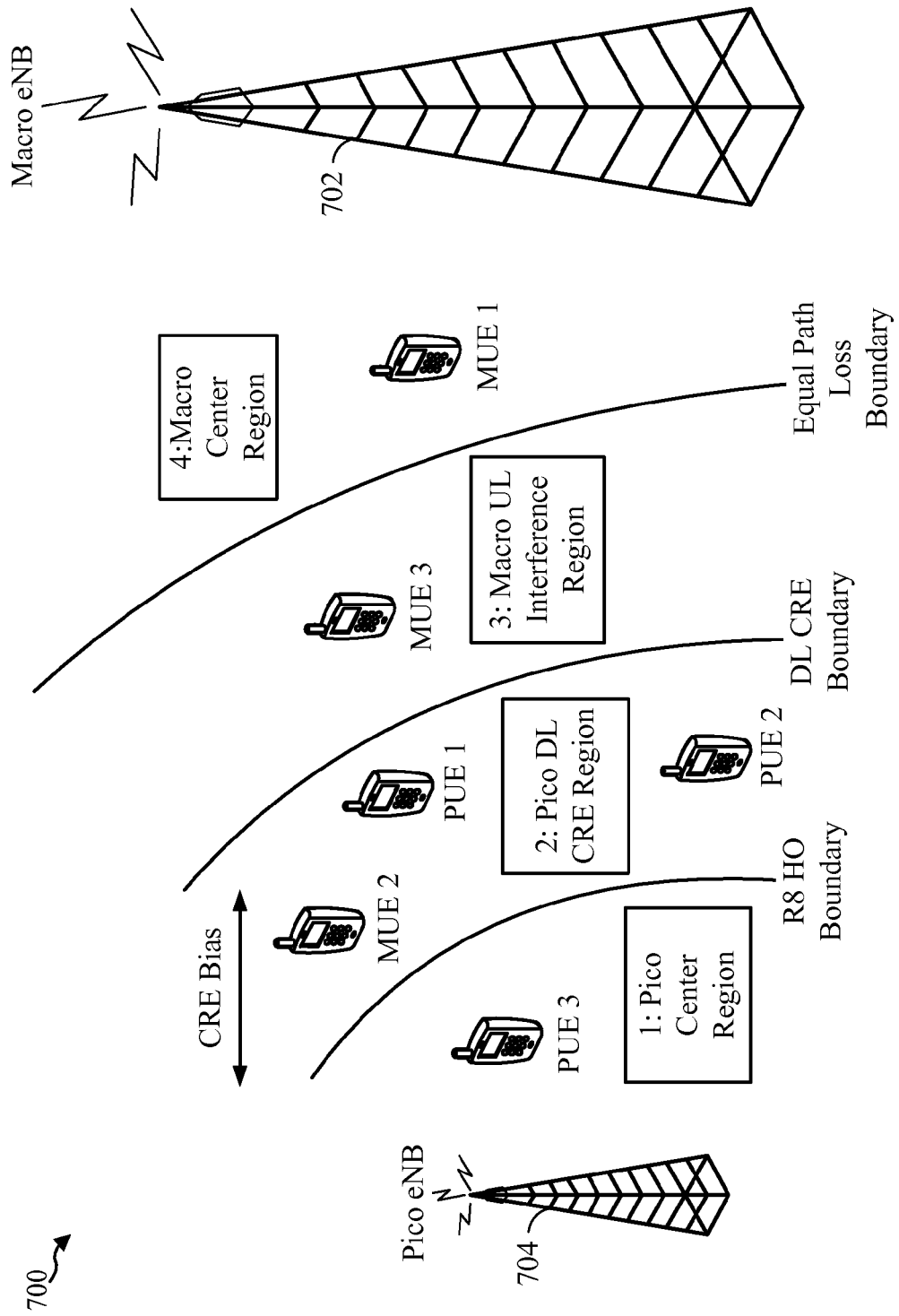
FIG. 7 illustrates an example heterogeneous network capable of employing enhanced inter-cell interference coordination (eICIC) in accordance with certain aspects of the present disclosure.

FIG. 7 illustrates an example heterogeneous network (HetNet) 700 showing various UL interference scenarios between a pico eNB and pico UEs, in accordance with certain aspects of the present disclosure. In certain aspects, several regions may be defined in the network 700, based on whether UEs in a particular region are subject to cause or experience high interference on UL or DL.

For example, a Pico center region 1 may be defined that includes pico UEs (PUEs) (e.g. PUE3) that are closest to the pico eNB 704 on both UL and DL. In an aspect the pico center region 1 may extend until an R8 handover (HO) boundary. Generally, the R8 HO boundary indicates the maximum distance from the macro eNB 702 after which a legacy R8 macro UE may be handed over to the pico eNB 704.

A Pico DL CRE region 2 may be defined between the R8 HO boundary and a DL CRE boundary, that includes UEs (macro and/or pico UEs) in a pico CRE region (as defined by the CRE bias) that are closest to the macro eNB 702 on the DL and to the pico eNB 704 on the UL. The UEs in the region 2 may be pico UEs (e.g. PUE1 and PUE2) and/or legacy macro UEs (MUEs) that may not detect the weak pico cell 704 (e.g. MUE2).

A Macro UL interferer region 3 may be defined between the DL CRE boundary and an equal path loss (PL) boundary, that includes macro UEs (e.g. MUE3) that are beyond the pico CRE region, but still are closest to the macro cell 702 on the DL and to the pico cell 704 on the UL.

A Macro center region 4 may be defined near the macro eNB 702, that includes macro UEs that closest to the macro cell 702 on both the UL and the DL.

In certain aspects, from the UL standpoint, high interference condition may be caused by macro UEs in Regions 2 and 3 to UL transmissions between the pico UEs and pico eNB 704 in these regions. For example, as shown in FIG. 7, the legacy MUE2 in region 2 is closer to the pico cell 704 than PUE1 and PUE2. This may lead to a power racing condition between the UEs and consequently an outage in performance. MUE3 in region 3, on the other hand, while possibly not causing a power racing condition, may still cause high interference to the pico eNB 704 as it may have a smaller path loss compared to its own serving macro cell 702.

As noted above, the UL interference scenario for pico UEs may be distinct from their DL interference scenario. For example, PUE1 and PUE2, while in the DL CRE region 2 may be subject to strong DL interference from macro eNB 702, but may only be subject to dominant UL interference from the legacy MUE2. Clearly, therefore, the desired scheduling restriction (e.g., UL ABS pattern) on UL applicable to pico UEs in Region 2 should differ from the DL restriction. Thus, there is a need for a suitable delinking between uplink and downlink scheduling in such scenarios.

Certain aspects of the present disclosure discuss techniques to remove this tight linkage between the DL ABS pattern and the UL ABS pattern, that accomplish the delinking by reliably delivering UL grant (e.g., including assignment of UL resources) to a UE, e.g., pico UE in the pico CRE region, without using DL ABS resources in which an interfering cell has limited transmission in an attempt to reduce interference to other victim cells. In certain aspects, broadly two techniques are discussed. In one technique, instead of using the regular PDCCH sent in the DL ABS for UL grant transmission, the UL grant is sent on another more reliable DL control channel using resources configured to avoid interference with transmissions from an interfering base station. In another technique, the DL grant is still sent on PDCCH in non-DL ABS resources, but enhanced UE capabilities are used to process the received control information at the UE. For example, the enhanced UE capabilities may include interference cancellation (IC).

In accordance with the first technique, enhanced PDCCH (E-PDCCH), which is a newly designed PDCCH (similar to R-PDCCH) may be used to send the UL grant to UEs of a victim cell. In certain aspects the E-PDCCH is transmitted using resources selected to avoid interference using frequency domain resource partitioning between base stations. These resources may include downlink resources such as PDSCH. Generally speaking, in some aspects, downlink resources (e.g., PDSCH resources) may be allocated between the serving base station and interfering base station in the frequency domain, and the assignment of uplink resources may be received via a downlink resource allocated for the serving base station (e.g., on E-PDCCH).

In accordance with the second technique, a pico UE in the CRE region 2 may perform PDCCH Interference Cancellation (IC) to cancel signals transmitted from an interfering base station (e.g., macro eNB 702) to decode the pico UE's UL grant transmitted from a serving pico eNB 704. However, in order to use the PDCCH IC based approach, the pico eNB 704 may need to identify pico UEs that may get reliable UL grant using PDCCH-IC. The pico eNB 704 may make this decision based on a number of factors or parameters. In certain aspects, the pico eNB may first check a capability of the pico UE to perform PDCCH IC before sending the UL grant in the PDCCH. This may include the pico UE sending an indication of its capability to perform PDCCH IC on request from the pico eNB 704 or on its own without receiving such request. In certain aspects, the pico UE may report a channel condition of the PDCCH to the pico eNB 704 (e.g., after performing the PDCCH IC). The UE may also perform one or more radio link measurements on one or more non-DL ABS resources of the pico eNB 704 based on the channel condition of the PDCCH (e.g., after performing the PDCCH IC), and report the radio link measurements to the serving pico eNB 704. This may include reporting if Radio Link Failure (RLF) is triggered on the non-ABS resources. Additionally, a new "control Channel State Information (CSI)" (CSI for control region) reporting may also be used.

In certain aspects, the pico eNB 704 may send UL grant to pico UEs using DL ABS resources, but with a configurable offset between UL grant and UL transmission (e.g. not a fixed offset of 4 ms as noted above). In certain aspects, the UL grant may include the configurable time offset information for the UL transmission. Additionally or alternatively, one UL grant may include multiple UL transmission assignments. Additionally or alternatively, an UL grant may span different subframes.

In certain aspects, a UL ABS pattern may also be defined with a bitmap pattern (e.g., similar to the DL ABS pattern) to present the UL interference condition to the pico cell 704 caused by nearby macro UEs. For example, a Bit with value 1 may indicate a subframe where the macro eNB 702 does not schedule UL transmission of macro UEs that may cause UL interference to the pico cell 704. The pico cell may use these subframes to schedule UL transmission of UEs in the CRE region 2. A bit with value 0 may indicate a subframe where macro eNB 702 may schedule UL transmission of macro UEs that may cause UL interference to the pico cell 704. The pico cell 704 may schedule UL transmission of center pico UEs that may be less susceptible to UL interference from macro UEs.

Figure 8:
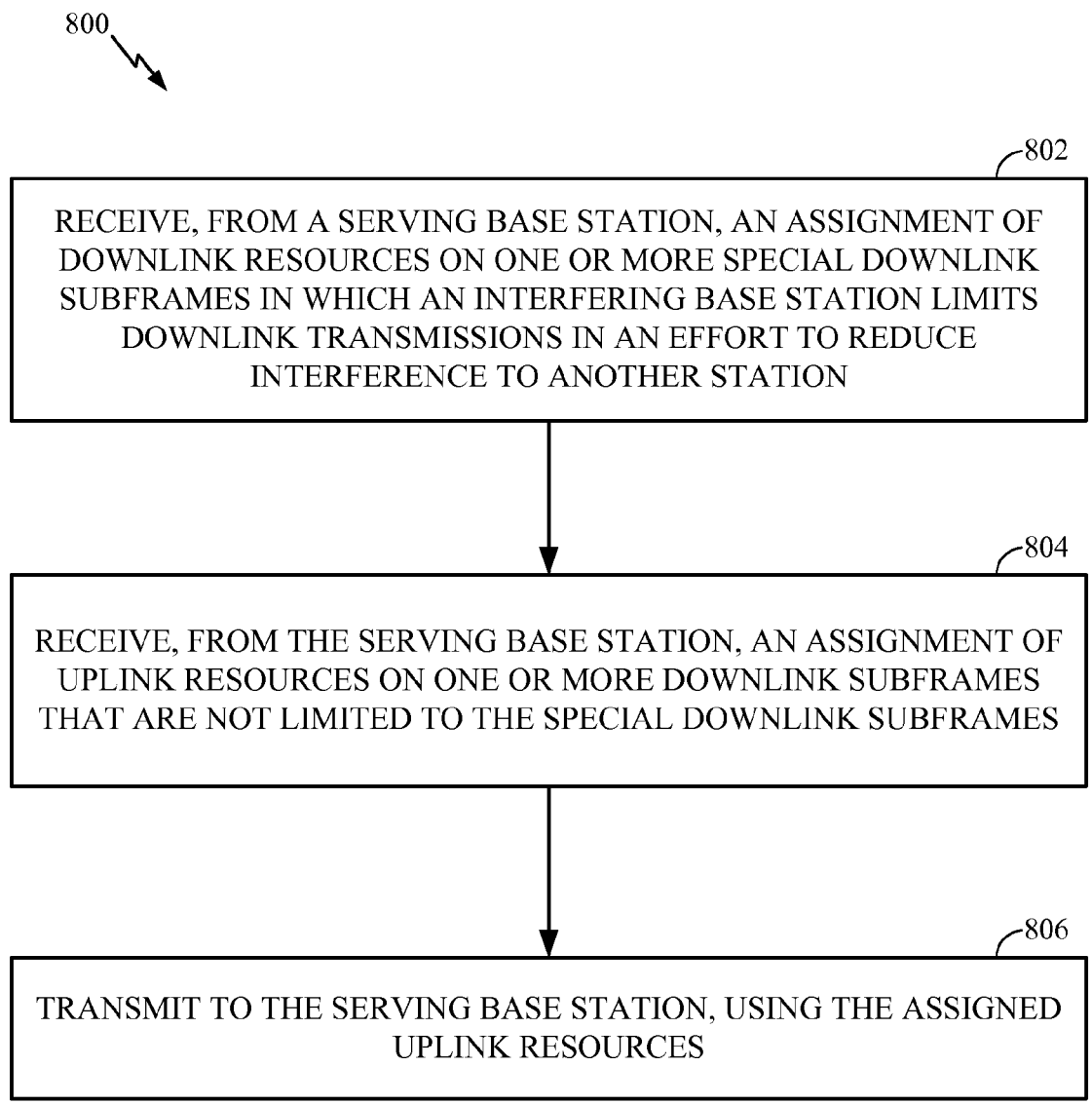
FIG. 8 illustrates example operations that may be performed by a UE, for reducing interference in a heterogeneous network, in accordance with certain aspects of the present disclosure.

FIG. 8 illustrates example operations 800 that may be performed by a UE, for reducing interference in a heterogeneous network, in accordance with certain aspects of the present disclosure. In an aspect the UE may include a pico UE PUE1, PUE2, PUE3, or 1008.

Operations 800 begin, at 802, by receiving, from a serving base station, an assignment of downlink resources on special downlink subframes in which an interfering base station limits downlink transmissions in an effort to reduce interference to another station. At 804, the UE may reliably receive from the serving base station, an assignment of uplink resources on downlink subframes that are different from the special downlink subframes. At 806, the UE may transmit to the serving base station using the assigned uplink resources.

In an aspect, the serving base station may include a pico eNB 704 or 1004, and the interfering base station may include a macro eNB 702 or 1002. In an aspect, the special downlink subframes may include ABSs, and the downlink subframes different from the special downlink subframes may include subframes that are not protected from interference from the interfering base station. In an aspect, the assignment of UL resources may include a UL ABS pattern for UL transmissions by the pico UEs.

Figure 9:
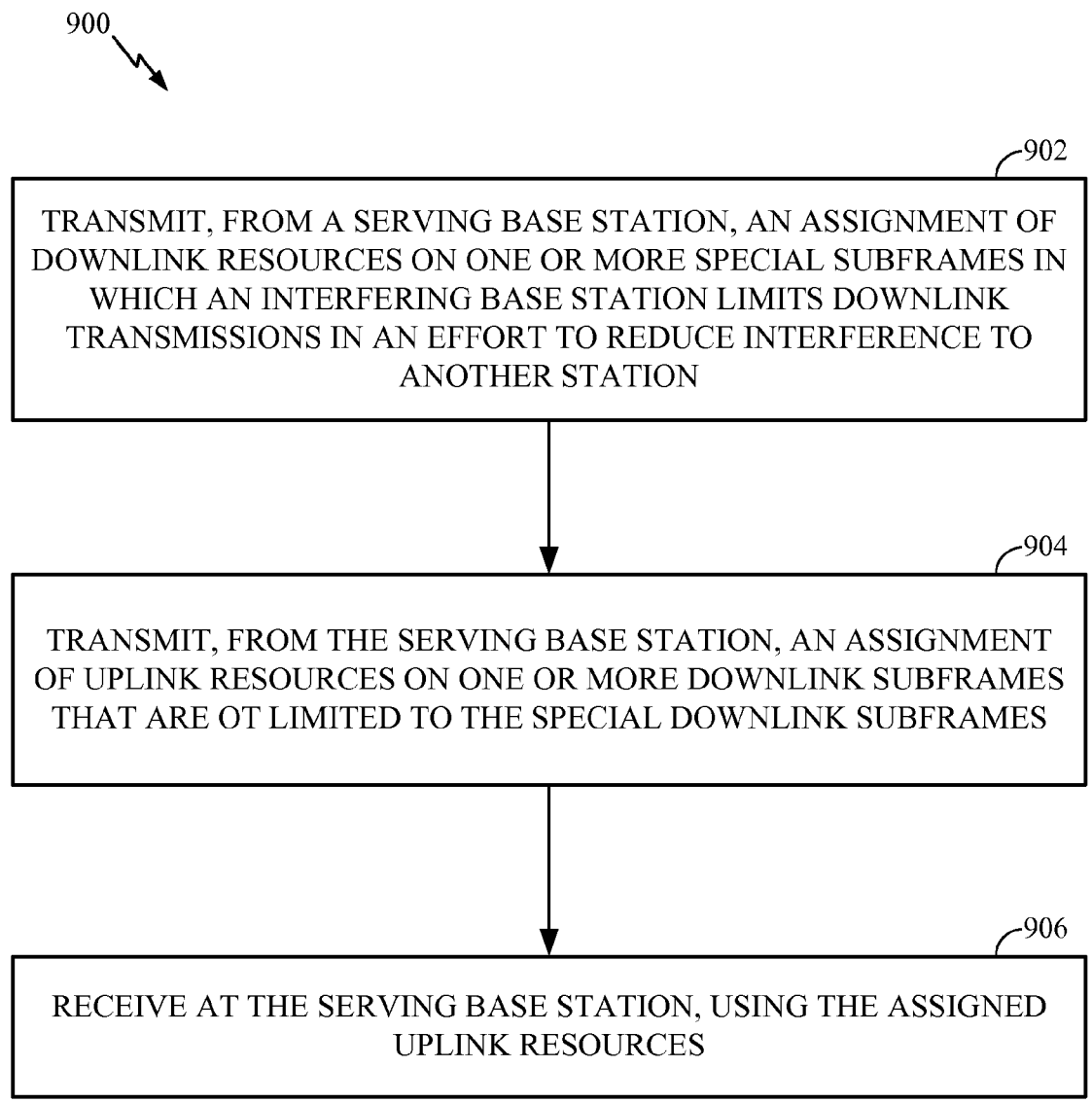
FIG. 9 illustrates example operations that may be performed by a serving base station, for reducing interference in a heterogeneous network, in accordance with certain aspects of the present disclosure.

FIG. 9 illustrates example operations 900 that may be performed by a serving base station, for reducing interference in a heterogeneous network, in accordance with certain aspects of the present disclosure. In an aspect the base station may include and pico eNB 704 or 1004.

Operations 900 may begin, at 902 by, transmitting, from the serving base station, an assignment of downlink resources on special subframes in which an interfering base station limits downlink transmissions in an effort to reduce interference to another station. At 904, the serving base station may transmit an assignment of uplink resources on downlink subframes that are different from the special downlink subframes. At 906, the serving base station may receive using the assigned uplink resources.

In an aspect, the interfering base station may include a macro eNB 702 or 1002. In an aspect, the special downlink subframes may include ABSs, and the downlink subframes different from the special downlink subframes may include subframes that are not protected from interference from the interfering base station. In an aspect, the assignment of UL resources may include a UL ABS pattern for UL transmissions by the pico UEs.

In certain aspects, a macro eNB (e.g., macro eNB 702) may reserve uplink resources for some of its served macro UEs (e.g., MUEs 1, 2 and 3). The macro eNB may provide pico eNBs information regarding this partitioning of resources. In an aspect, the pico eNBs may not use the reserved resources for communicating with pico UEs, for example in the CRE area. Alternatively or additionally, in some aspects, the macro eNB may identify certain uplink resources that may not be used by some of its served macro UEs and which may be intended for use by pico UEs associated with the pico eNBs.

In certain aspects, the reserved resources may be used by macro UEs that may cause UL interference to pico cells. For example, as noted above, macro UEs close to a pico cell, which a serving macro eNB has not handed over to the pico cell, may cause UL interference to the pico cell UEs. Accordingly, these macro UEs may use the reserved UL resources. Additionally, legacy UEs may not detect weak pico cells and, therefore, may use the reserved UL resources.

In certain aspects, the resource partitioning may be performed in frequency domain, time domain, or a combination thereof. For frequency domain resource partitioning, some radio resource blocks (component carriers) may be designated for some UEs (e.g., Release 8 macro UEs). For time domain resource partitioning, a subset of UL subframes may be designated for some UEs (e.g., Release 8 macro UEs).

In certain aspects, macro and pico eNBs may exchange messaging required for the resource partitioning, e.g., using a backhaul interface. For example, a pico eNB may transmit a feedback parameter to one or more macro eNBs conveying UL load (e.g., how many channel resources are or will be consumed) from pico UEs. A macro eNB may perform resource partitioning (e.g., including amount of resources for MUEs) by comparing the UL load information of the pico UEs received from one or more pico eNBs and UL load of MUEs that may use the reserved resources. Macro eNBs may transmit an information element/message (e.g., a status reporting message such as a resource status message) to inform pico eNBs of the UL resource restriction.

In certain aspects, legacy macro UEs that may not interfere with a pico cell (e.g., legacy macro UEs that may be far away from the pico cell) may not need to use the reserved resources. However, a macro eNB may not know how close a particular macro UE is to one or more pico cells, and thus may not know whether the macro UE may interfere with the pico UE. Consequently, the macro eNB may reserve resources for even those macro UEs that need not use reserved resources. Thus, there is need for techniques to enable a macro eNB to identify macro UEs that do not interfere with a pico cell and need not use reserved resources.

In certain aspects, a pico eNB may detect interfering macro UEs (e.g., legacy macro UEs) using reference signal (e.g., sounding reference signal (SRS)) detection and send an indication of the detected macro UEs to an interfering macro eNB.

Figure 10:
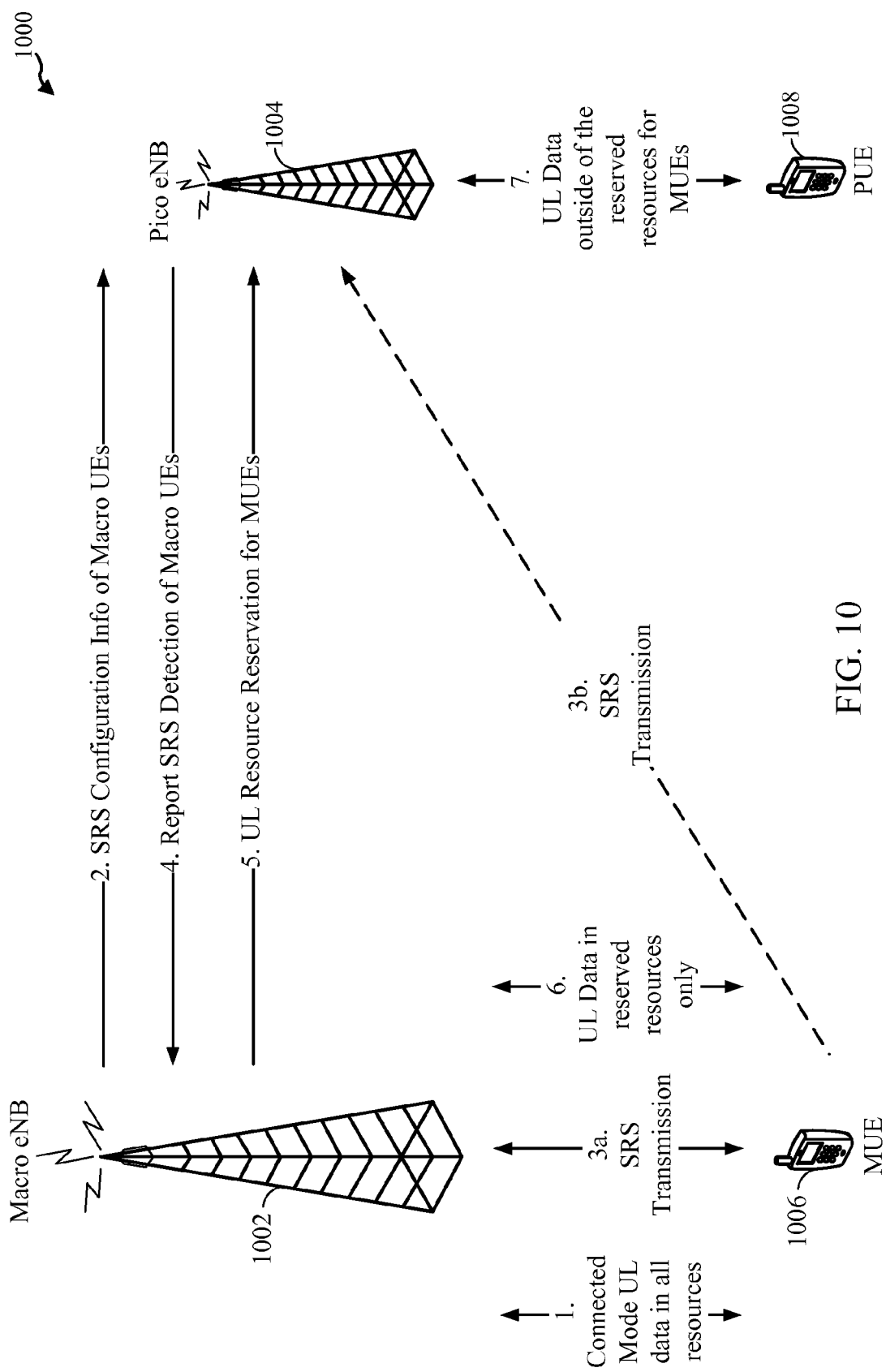
FIG. 10 illustrates an example method to detect one or more macro UEs that may cause UL interference with pico cells, in accordance with certain aspects of the present disclosure.

FIG. 10 illustrates an example method 1000 to detect one or more macro UEs that may cause UL interference with pico cells, in accordance with certain aspects of the present disclosure. At step 1, a macro eNB 1002 may be in a connected mode with a macro UE 1006 (e.g., Release 8-compliant (R8) UE). At this time macro UE 1006 may use uplink resources without restriction to transmit data to macro eNB 1002.

At step 2, macro eNB 1002 may provide reference signal (e.g., sounding reference signal (SRS)) configuration information of one or more macro UEs that may potentially interfere with pico cells to a pico eNB 1004. For example, macro eNB 1002 may provide pico eNB 1004 with SRS configuration information of macro UE 1006 which may move closer to the pico eNB 1004 and start interfering with the pico eNBs transmissions. Additionally, the macro eNB 1002 may also provide SRS configuration information regarding other macro legacy UEs which may potentially interfere with the pico eNB 1004. In certain aspects, each SRS configuration may have an index indicating a UE.

At steps 3a and 3b, macro eNB 1002 and pico eNB 1004 may receive SRS transmissions (e.g., periodically, aperiodically or in response to an event) from one or more macro UEs, including macro UE 1006 which may be close enough to the pico eNB 1004 so that the pico eNB 1004 may receive the SRS from the macro UE 1006. Pico eNB 1004 may use the provided SRS configuration (e.g., provided at step 2) to detect the SRS transmissions from one or more macro UEs, including macro UE 1006.

At step 4, the pico eNB 1004 may report SRS detection of one or more macro UEs to macro eNB 1002. In an aspect, when pico eNB 1004 detects a matching SRS transmission, it may inform macro eNB 1002 of the index of the detected SRS configuration. In this manner, the macro eNB 1002 may become aware of macro UEs proximate to pico eNB 1004 that may interfere with the pico eNB 1004 and need to use reserved resources assigned by the macro eNB 1002.

At step 5, macro eNB 1002 may transmit UL resource reservation for detected macro UEs to pico eNB 1004. The pico eNB 1004 may the allocate resources to pico UEs 1008 that are different from the reserved resources, such that UL interference is reduced and/or minimized. According to aspects, macro eNB 1002 may determine an amount of resources to reserve for macro UEs detected by pico eNB 1004 based on (e.g., by comparing) UL load from pico CRE UEs and UL load from macro UEs that may use the reserved resources.

At step 6, macro eNB 1002 may use the reserved UL resources for (e.g., only for) the detected macro UEs, including UE 1006. At step 7, pico eNB 1004 and pico UE 1008 may communicate using resources which are not reserved for detected, potentially interfering, macro UEs, including macro UE 1006.

Figure 11:
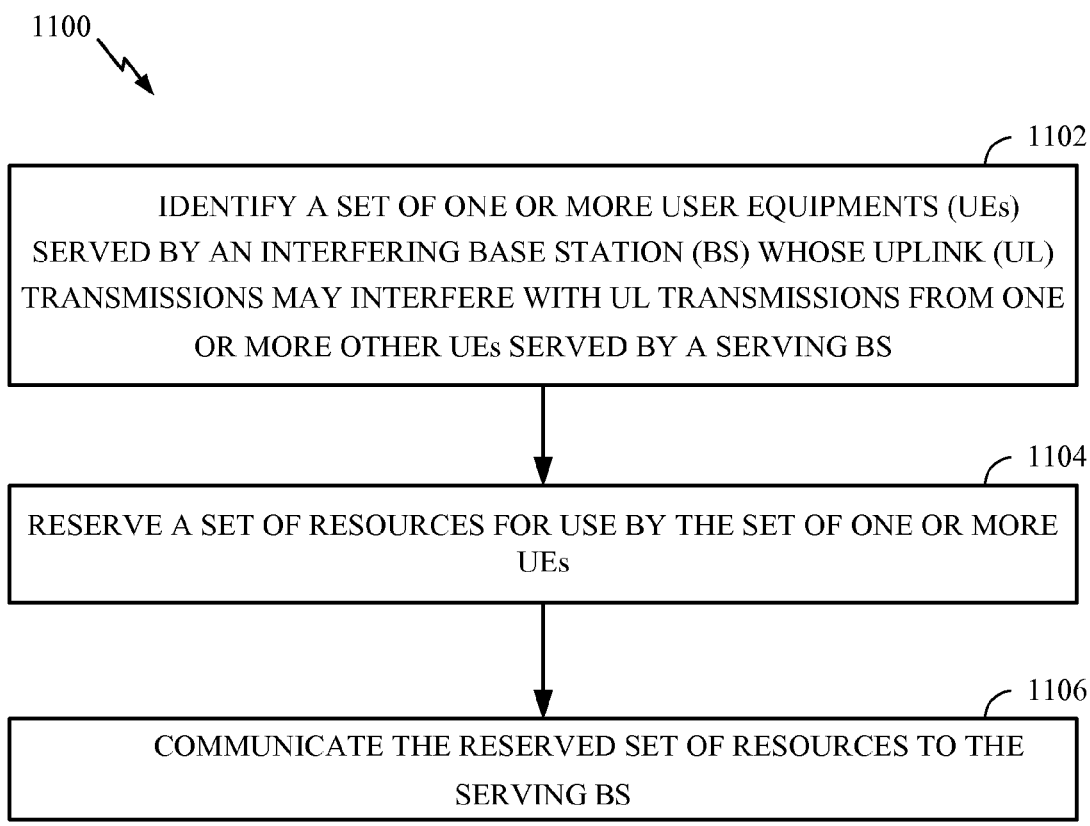
FIG. 11 illustrates example operations which may be performed, for example, by an interfering base station (BS), in accordance with certain aspects of the present disclosure.

FIG. 11 illustrates example operations 1100 which may be performed, for example, by an interfering base station (BS), in accordance with certain aspects of the present disclosure. In an aspect, the interfering base station may include macro eNB 702 or 1002.

The operations 1100 begin, at 1102, by identifying a set of one or more user equipments (UEs) served by the interfering BS whose UL transmission may interfere with UL transmission from one or more other UEs served by a serving BS. In an aspect, the serving BS may include pico eNB 704 or 1004, the one or more UEs served by the interfering BS may include macro UEs MUE 1, MUE 2, MUE 3 and/or 1006, and the one or more other UEs served by the serving BS may include pico UEs PUE 1, PUE 2, PUE 3, and/or 1008. At 1104, the interfering BS reserves a set of resources for use by the set of one or more UEs. At 1106, the interfering BS communicates the reserved set of resources to the serving BS.

In certain aspects, the interfering BS may transmit SRS configuration information for the set of one or more UEs to the serving BS. The interfering BS may receive, from the serving BS, a report indicating UEs served by the interfering BS and detected by the serving BS based on the SRS configuration information. The interfering BS may identify the set of UEs based on such report. In certain aspects, the interfering BS may receive from the serving BS uplink loading information for the one or more other UEs. The interfering BS may determine the amount of resources to reserve based on at least one of uplink loading information for the set of one or more user equipments (UEs) served by a interfering BS or uplink loading information for the one or more other UEs served by the serving BS. The interfering BS may allocate the reserved resources for communications between the interfering BS and the set of one or more UEs served by the interfering BS.

Figure 12:
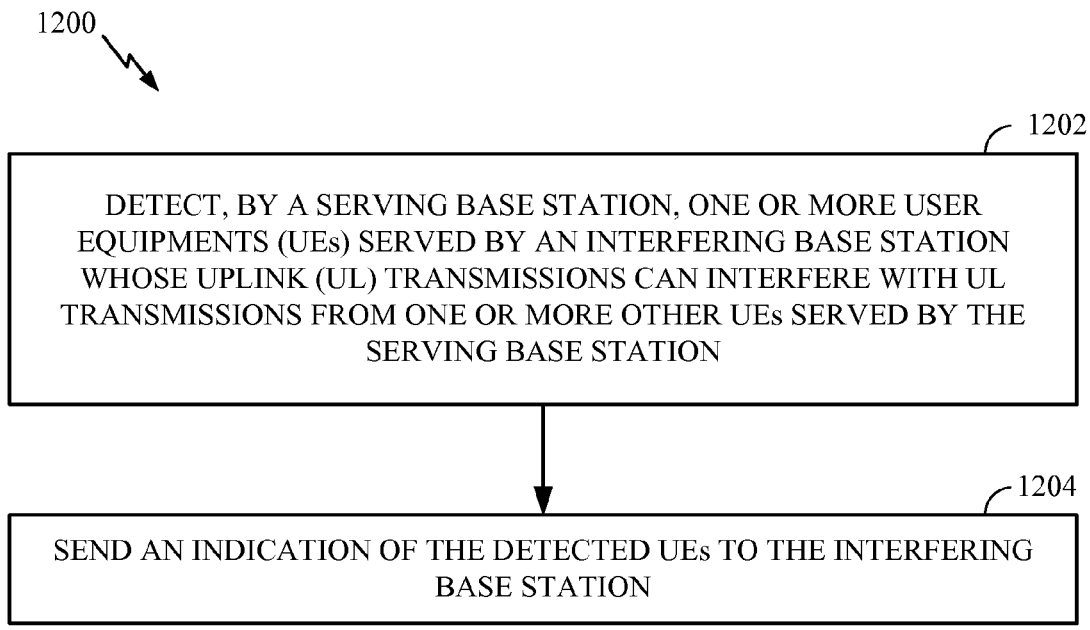
FIG. 12 illustrates example operations which may be performed, for example, by a serving base station, in accordance with certain aspects of the present disclosure.

FIG. 12 illustrates example operations 1200 which may be performed, for example, by a serving base station, in accordance with certain aspects of the present disclosure. In an aspect, the serving BS may include pico eNB 704 or 1004.

The operations 1200 may begin, at 1202, by detecting, by the serving base station, one or more UEs served by the interfering base station whose UL transmissions can interfere with UL transmissions from one or more other UEs served by the serving base station. In an aspect, the interfering base station may include macro eNB 702 or 1002, the one or more UEs served by the interfering BS may include macro UEs MUE 1, MUE 2, MUE 3 and/or 1006, and the one or more other UEs served by the serving BS may include pico UEs PUE 1, PUE 2, PUE 3, and/or 1008. At 1204, the serving base station sends an indication of the detected UEs to the interfering base station.

In an aspect, the serving base station may receive SRS configuration information for one or more UEs served by the interfering base station. The serving base station may detect the one or more UEs by detecting reference signals (RSs) transmitted from the one or more UEs based on the SRS configuration information. In an aspect, the serving base station may receive from the interfering base station an indication of resources reserved for uplink transmissions by the one or more UEs. The serving base station may not allocate the reserved resources (e.g., allocate different resources) for communications between the serving base station and the one or more other UEs served by the serving base station thereby reducing and/or minimizing uplink interference.

Figure 13:
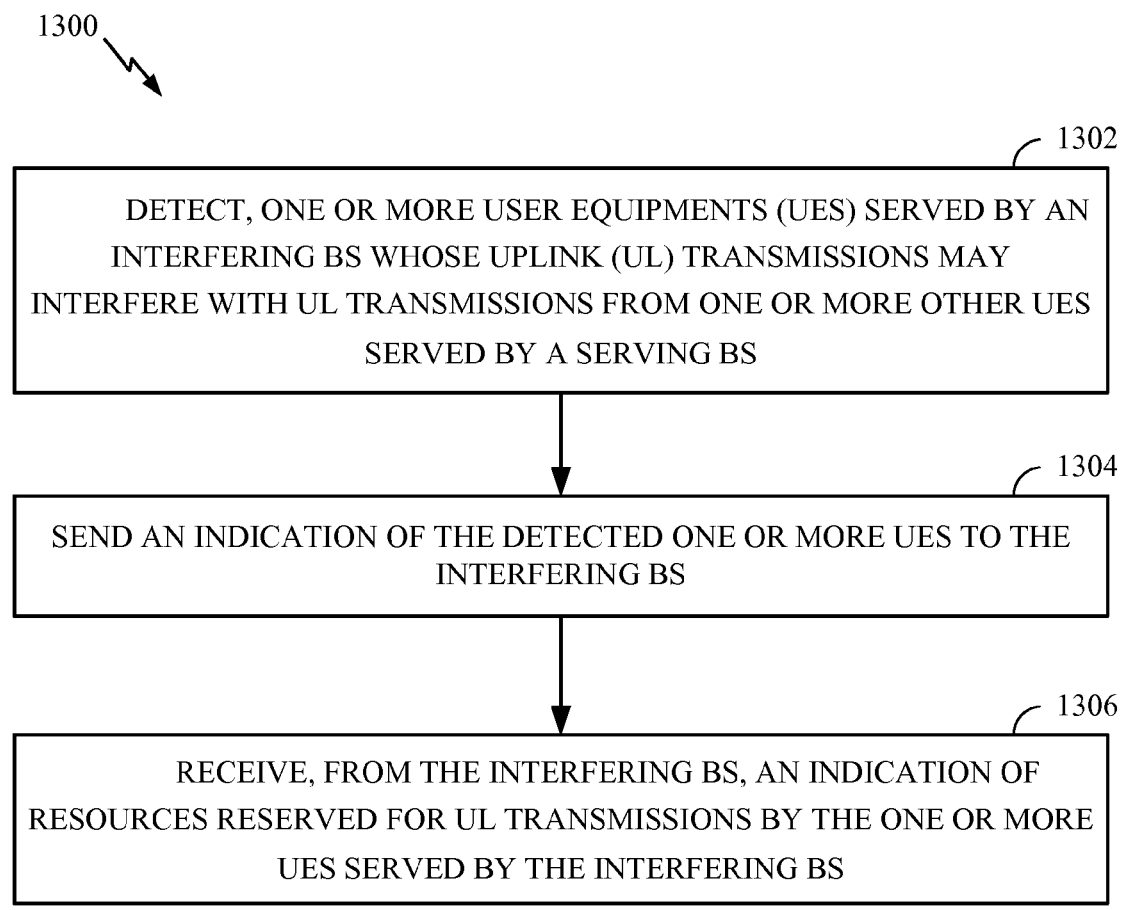
FIG. 13 illustrates example operations which may be performed, for example, by a serving base station (BS), in accordance with certain aspects of the present disclosure.

FIG. 13 illustrates example operations 1300 which may be performed, for example, by a serving base station (BS), in accordance with certain aspects of the present disclosure. In an aspect, the serving BS may include pico eNB 704 or 1004.

Figure 14:
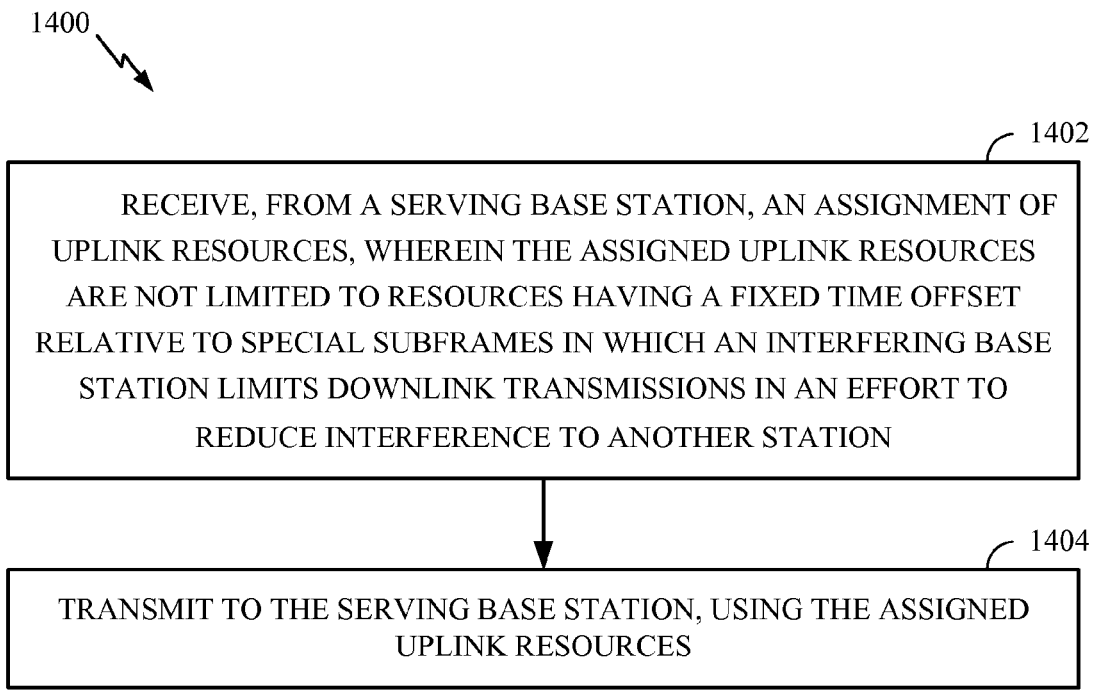
FIG. 14 illustrates example operations that may be performed by a UE, for decoupling downlink (DL) and uplink (UL) resource partitioning in heterogeneous networks, in accordance with certain aspects of the present disclosure.

The operations 1300 may begin, at 1302, by detecting, one or more UEs served by an interfering BS whose UL transmissions may interfere with UL transmission from one or more other UEs served by the serving BS. In an aspect, the interfering base station may include macro eNB 702 or 1002, the one or more UEs served by the interfering BS may include macro UEs MUE 1, MUE 2, MUE 3 and/or 1006, and the one or more other UEs served by the serving BS may include pico UEs PUE 1, PUE 2, PUE 3, and/or 1008. At 1304, the serving BS may send an indication of the detected one or more UEs to the interfering BS. At 1306, the serving BS may receive, from the interfering BS, an indication of resources reserved for UL transmissions by the one or more UEs served by the interfering BS In an aspect, the serving BS may not allocate the reserved resources for communications between the serving BS and the one or more UEs served by the serving BS. In an aspect, the reserved resources may include resources partitioned in at least one of time domain or a frequency domain from resources allocated for use by the serving base station. In an aspect, the serving BS may provide the interfering BS with an indication of a load from the one or more UEs served by the serving BS FIG. 14 illustrates example operations 1400 that may be performed by a UE, for decoupling downlink (DL) and uplink (UL) resource partitioning in heterogeneous networks, in accordance with certain aspects of the present disclosure. In an aspect the UE may include a pico UE PUE 1, PUE 2, PUE 3, or 1008.

Operations 1400 begin, at 1402, by receiving, from a serving base station, an assignment of uplink resources, wherein the assigned uplink resources are not limited to resources having a fixed time offset relative to special subframes in which an interfering base station limits downlink transmissions in an effort to reduce interference to another station. At 1404, the UE may transmit to the serving base station using the assigned uplink resources In an aspect, the serving base station may include a pico eNB 704 or 1004, and the interfering base station may include a macro eNB 702 or 1002. In an aspect, the special subframes may include ABSs. In an aspect, the assignment of UL resources may include a UL ABS pattern for UL transmissions by the pico UEs.

Figure 15:
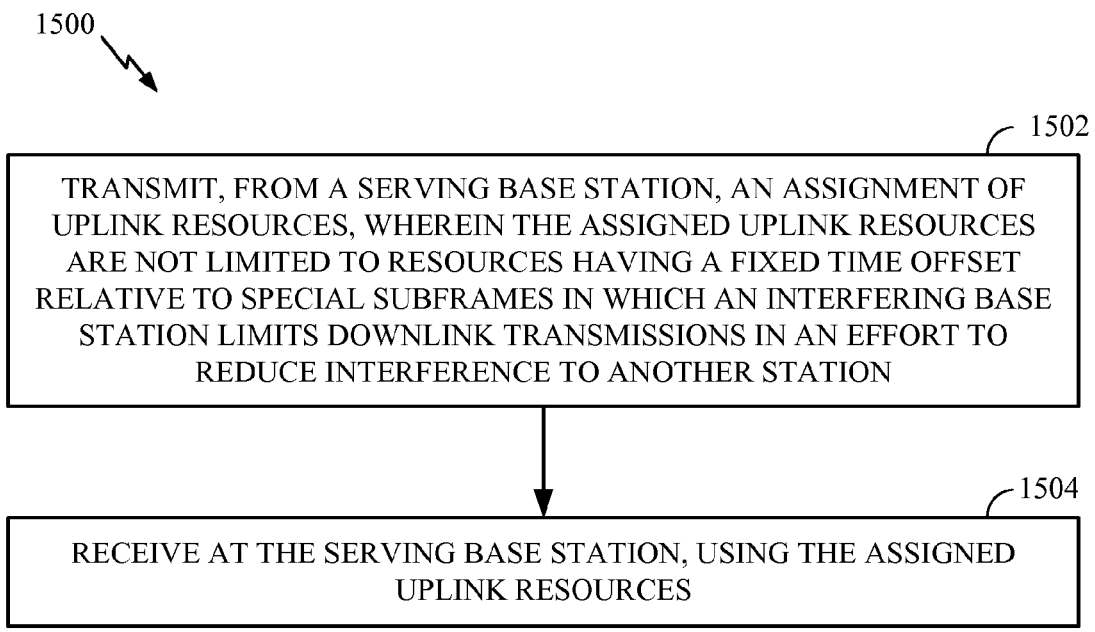
FIG. 15 illustrates example operations that may be performed by a serving base station, for decoupling downlink (DL) and uplink (UL) resource partitioning in heterogeneous networks, in accordance with certain aspects of the present disclosure.

FIG. 15 illustrates example operations 1500 that may be performed by a serving base station, for decoupling downlink (DL) and uplink (UL) resource partitioning in heterogeneous networks, in accordance with certain aspects of the present disclosure. In an aspect the serving base station may include and pico eNB 704 or 1004.

Operations 1500 may begin, at 1502 by, transmitting, from the serving base station, an assignment of uplink resources, wherein the assigned uplink resources are not limited to resources having a fixed time offset relative to special subframes in which an interfering base station limits downlink transmissions in an effort to reduce interference to another station. At 1504, the serving base station receives using the assigned uplink resources In an aspect, the interfering base station may include a macro eNB 702 or 1002. In an aspect, the special subframes may include ABSs. In an aspect, the assignment of UL resources may include a UL ABS pattern for UL transmissions by the pico UEs.

The various operations of methods described above may be performed by any suitable means capable of performing the corresponding functions. The means may include various hardware and/or software component(s) and/or module (s), including, but not limited to a circuit, an application specific integrated circuit (ASIC), or processor.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a User Equipment (UE), comprising:
   receiving, from a serving base station, an assignment of downlink resources on one or more special downlink subframes in which an interfering base station limits downlink transmissions in an effort to reduce interference to another station;
   receiving, from the serving base station, an assignment of uplink resources on one or more downlink subframes that are not limited to the special downlink subframes, wherein receiving the assignment of the uplink resources includes receiving the assignment of uplink resources in a physical downlink control channel (PDCCH);
   performing interference cancellation (IC) to cancel signals transmitted from the interfering base station when decoding the PDCCH; and transmitting to the serving base station, using the assigned uplink resources.

2. The method of claim 1, wherein the one or more special subframes comprise one or more special subframes in which the interfering base station limits downlink transmissions to reduce interference to another base station.

3. The method of claim 2, wherein the one or more special downlink subframes in which the interfering base station limits the downlink transmissions to reduce interference to the another base station comprise almost blank subframes (ABS).

4. The method of claim 1, wherein:
the serving base station comprises a base station of a first power class; and
the interfering base station comprises a base station of a second power class.

5. The method of claim 4, wherein:
the serving base station comprises a pico-cell base station; and
the interfering base station comprises a macro-cell base station.

6. The method of claim 1, further comprising:
signaling the serving base station of the UE capability of performing IC for the PDCCH.

7. The method of claim 6, further comprising reporting a channel condition of the PDCCH after the PDCCH IC is performed, to the serving base station.

8. The method of claim 6, further comprising:
performing one or more radio link measurements on one or more of the downlink subframes that are different from the special downlink subframes based on the channel condition of the PDCCH after the PDCCH IC is performed; and
reporting the one or more radio link measurements to the serving base station.

9. The method of claim 1, wherein:
the assignment assigns the uplink resources across more than one uplink subframe.

10. The method of claim 9, wherein:
the assignment assigns the uplink resources in one or more uplink subframes that are offset from the special downlink subframe by one or more respective configurable offsets.

11. The method of claim 10, wherein the one or more respective configurable time offsets are conveyed with the assignment.

12. A method for wireless communications by a User Equipment (UE), comprising:
receiving, from a serving base station, an assignment of downlink resources on one or more special downlink subframes in which an interfering base station limits downlink transmissions in an effort to reduce interference to another station;
receiving, from the serving base station, an assignment of uplink resources on one or more downlink subframes that are not limited to the special downlink subframes, wherein the assignment of the uplink resources is conveyed in an enhanced physical downlink control channel (E-PDCCH) using resources configured to avoid interference with transmissions from the interfering base station; and
transmitting, to the serving base station, using the assigned uplink resources.

13. The method of claim 12, wherein the E-PDCCH is transmitted using resources selected to avoid interference using frequency domain resource partitioning between base stations.

14. The method of claim 12, wherein receiving the assignment of uplink resources includes receiving the assignment of uplink resources via a downlink resource allocated for the serving base station from downlink resources allocated between the serving base station and interfering base station in the frequency domain.

15. The method of claim 14, wherein:
the downlink resources allocated between the serving base station and interfering base station in the frequency domain include resources of a PDSCH;
wherein receiving the assignment of the uplink resources via a downlink resource allocated for the serving base station includes receiving the assignment of uplink resources on an E-PDCCH via a resource allocated for the serving base station.

16. An apparatus for wireless communications, comprising:
means for receiving, from a serving base station, an assignment of downlink resources on one or more special downlink subframes in which an interfering base station limits downlink transmissions in an effort to reduce interference to another station;
means for receiving, from the serving base station, an assignment of uplink resources on one or more downlink subframes that are not limited to the special downlink subframes, wherein receiving the assignment of the uplink resources includes receiving the assignment of uplink resources in a physical downlink control channel (PDCCH);
means for performing interference cancellation (IC) to cancel signals transmitted from the interfering base station when decoding the PDCCH; and
means for transmitting to the serving base station, using the assigned uplink resources.

17. The apparatus of claim 16, wherein the one or more special downlink subframes comprise an almost blank subframe (ABS) in which the interfering base station limits the downlink transmissions to reduce interference to the another base station.

18. An apparatus for wireless communications, comprising:
at least one processor configured to:
receive, from a serving base station, an assignment of downlink resources on one or more special downlink subframes in which an interfering base station limits downlink transmissions in an effort to reduce interference to another station;
receive, from the serving base station, an assignment of uplink resources on one or more downlink subframes that are not limited to the special downlink subframes, wherein receiving the assignment of the uplink resources includes receiving the assignment of uplink resources in a physical downlink control channel (PDCCH);
perform interference cancellation (IC) to cancel signals transmitted from the interfering base station when decoding the PDCCH; and
transmit to the serving base station, using the assigned uplink resources, and
a memory coupled to the at least one processor.

19. The apparatus of claim 18, wherein the one or more special downlink subframes comprise an almost blank subframe (ABS) in which the interfering base station limits the downlink transmissions to reduce interference to the another base station.

20. A non-transitory computer-readable medium comprising instructions for:
- receiving, from a serving base station, an assignment of downlink resources on one or more special downlink subframes in which an interfering base station limits downlink transmissions in an effort to reduce interference to another station;
- receiving, from the serving base station, an assignment of uplink resources on one or more downlink subframes that are not limited to the special downlink subframes, wherein receiving the assignment of the uplink resources includes receiving the assignment of uplink resources in a physical downlink control channel (PDCCH);
- performing interference cancellation (IC) to cancel signals transmitted from the interfering base station when decoding the PDCCH; and
- transmitting to the serving base station, using the assigned uplink resources.

21. The non-transitory computer-readable medium of claim 20, wherein the one or more special downlink subframes comprise an almost blank subframe (ABS) in which the interfering base station limits the downlink transmissions to reduce interference to the another base station.

22. A method for wireless communications by a serving base station, comprising:
- transmitting, from the serving base station, an assignment of downlink resources on one or more special downlink subframes in which an interfering base station limits downlink transmissions in an effort to reduce interference to another station;
- transmitting, from the serving base station, an assignment of uplink resources on one or more downlink subframes that are not limited to the special downlink subframes;
- receiving at the serving base station, using the assigned uplink resources;
- detecting, by the serving base station, one or more user equipments (UEs) served by the interfering base station whose uplink (UL) transmissions can interfere with UL transmissions from one or more other UEs served by the serving base station; and
- sending an indication of the detected UEs to the interfering base station.

23. The method of claim 22, wherein the one or more special downlink subframes comprise an almost blank subframe (ABS), in which the interfering base station limits the downlink transmission to reduce interference to the another base station.

24. The method of claim 22, wherein the assignment of the uplink resources is based on a bitmap indicating one or more subframes which the interfering base station does not assign as uplink resources to one or more user equipments that are served by the interfering base station and can cause uplink interference to the serving base station.

25. The method of claim 22, wherein:
- the serving base station comprises a base station of a first power class; and
- the interfering base station comprises a base station of a second power class.

26. The method of claim 25, wherein:
- the serving base station comprises a pico-cell base station; and
- the interfering base station comprises a macro-cell base station.

27. The method of claim 22, wherein:
- transmitting the assignment of the uplink resources includes transmitting the assignment of uplink resources in a physical downlink control channel (PDCCH),
- wherein a user equipment (UE) served by the serving base station performs interference cancellation (IC) to cancel signals transmitted from the interfering base station when decoding the PDCCH.

28. The method of claim 27, further comprising:
- receiving, at the serving base station, signaling of the UE capability of performing IC for the physical downlink control channel (PDCCH).

29. The method of claim 28, further comprising receiving from the UE a report regarding channel condition of the PDCCH after the PDCCH IC is performed by the UE.

30. The method of claim 28, further comprising:
- receiving one or more radio link measurements from the UE, wherein the UE performs the one or more radio link measurements on one or more of the downlink subframes that are different from the one or more special downlink subframes based on the channel condition of the PDCCH after the PDCCH IC is performed.

31. The method of claim 22, wherein:
- the assignment assigns the uplink resources across more than one uplink subframe.

32. The method of claim 31, wherein:
- the assignment assigns the uplink resources in one or more uplink subframes that are offset from the special downlink subframe by one or more respective configurable offsets.

33. The method of claim 32, wherein the one or more respective configurable time offsets are conveyed with the assignment.

34. The method of claim 22, wherein:
- the assignment of the uplink resources is conveyed in an enhanced physical downlink control channel (E-PDCCH) using resources configured to avoid interference with transmissions from the interfering base station.

35. The method of claim 34, wherein the E-PDCCH is transmitted using resources selected to avoid interference using frequency domain resource partitioning between base stations.

36. The method claim 22, further comprising:
- wherein transmitting the assignment of uplink resources includes transmitting the assignment of uplink resources via a downlink resource allocated for the serving base station from downlink resources allocated between the serving base station and an interfering base station in the frequency domain.

37. The method of claim 36, wherein:
- the downlink resources allocated between the serving base station and interfering base station in the frequency domain include resources of a PDSCH;
- wherein transmitting the assignment of uplink resources via a downlink resource allocated for the serving base station includes transmitting the assignment of uplink resources on an E-PDCCH via a resource allocated for the serving base station.

38. The method of claim 22 further comprising:
- receiving sounding reference signal (SRS) configuration information for one or more UEs served by the interfering base station.

39. The method of claim 38 wherein detecting the one or more UEs comprises detecting reference signals (RSs) transmitted from the one or more UEs based on the SRS configuration information.

40. The method of claim 22, wherein detecting the one or more UEs comprises detecting reference signals (RSs) transmitted from the one or more UEs.

41. The method of claim 40, wherein the indication is transmitted via a backhaul link between the interfering and serving BSs.

42. The method of claim 22, further comprising:
receiving, from the interfering base station, an indication of resources reserved for uplink transmissions by the one or more UEs.

43. The method of claim 42 further comprising:
not allocating the reserved resources for communications between the serving base station and the one or more other UEs served by the serving base station.

44. The method of claim 42, wherein the reserved resources comprises resources partitioned in at least one of a time domain or a frequency domain from resources allocated for use by the serving base station.

45. The method of claim 22, further comprising:
providing the interfering base station with an indication of a load from one or more UEs served by the serving base station.

46. An apparatus for wireless communications, comprising:
means for transmitting, from a serving base station, an assignment of downlink resources on one or more special downlink subframes in which an interfering base station limits downlink transmissions in an effort to reduce interference to another station;
means for transmitting, from the serving base station, an assignment of uplink resources on one or more downlink subframes that are not limited to the special downlink subframes;
means for receiving at the serving base station, using the assigned uplink resources;
means for detecting, by the serving base station, one or more user equipments (UEs) served by the interfering base station whose uplink (UL) transmissions can interfere with UL transmissions from one or more other UEs served by the serving base station; and
means for sending an indication of the detected UEs to the interfering base station.

47. The apparatus of claim 46, wherein the one or more special downlink subframes comprise an almost blank subframe (ABS), in which the interfering base station limits the downlink transmission to reduce interference to the another base station.

48. An apparatus for wireless communications, comprising:
at least one processor configured to:
transmit, from a serving base station, an assignment of downlink resources on one or more special downlink subframes in which an interfering base station limits downlink transmissions in an effort to reduce interference to another station;
transmit, from the serving base station, an assignment of uplink resources on one or more downlink subframes that are not limited to the special downlink subframes;
receive at the serving base station, using the assigned uplink resources, and a memory coupled to the at least one processor;
detect, by the serving base station, one or more user equipments (UEs) served by the interfering base station whose uplink (UL) transmissions can interfere with UL transmissions from one or more other UEs served by the serving base station; and
send an indication of the detected UEs to the interfering base station.

49. The apparatus of claim 48, wherein the one or more special downlink subframes comprise an almost blank subframe (ABS), in which the interfering base station limits the downlink transmission to reduce interference to the another base station.

50. A non-transitory computer-readable medium comprising instructions for:
transmitting, from a serving base station, an assignment of downlink resources on one or more special downlink subframes in which an interfering base station limits downlink transmissions in an effort to reduce interference to another station;
transmitting, from the serving base station, an assignment of uplink resources on one or more downlink subframes that are not limited to the special downlink subframes;
receiving at the serving base station, using the assigned uplink resources;
detecting, by the serving base station, one or more user equipments (UEs) served by the interfering base station whose uplink (UL) transmissions can interfere with UL transmissions from one or more other UEs served by the serving base station; and
sending an indication of the detected UEs to the interfering base station.

51. The non-transitory computer-readable medium of claim 50, wherein the one or more special downlink subframes comprise an almost blank subframe (ABS), in which the interfering base station limits the downlink transmission to reduce interference to the another base station.

52. A method for wireless communications, comprising:
receiving, from a serving base station, an assignment of uplink resources in a special subframe in which an interfering base station limits transmissions to reduce interference with transmissions from the serving base station, wherein the assigned uplink resources are in one or more subframes that are offset from the special subframe by one or more respective configurable time offsets and are offset relative to special subframes in which the interfering base station limits downlink transmissions in an effort to reduce interference to another station; and
transmitting to the serving base station, using the assigned uplink resources.

53. The method of claim 52, wherein the special subframes comprise almost blank subframes (ABSs), in which the interfering base station limits its downlink transmission to reduce interference to another base station.

54. The method of claim 52, wherein the assignment of uplink resources is based on a bitmap indicating one or more subframes which the interfering base station does not assign as uplink resources to one or more user equipments that are served by the interfering base station and can cause uplink interference to the interfered base station.

55. The method of claim 52, wherein:
the serving base station comprises a base station of a first power class; and
the interfering base station comprises a base station of a second power class.

56. The method of claim 55, wherein:
the serving base station comprises a pico-cell base station; and
the interfering base station comprises a macro-cell base station.

57. The method of claim 52, wherein:
receiving the assignment of uplink resources includes receiving the assignment of uplink resources in a physical downlink control channel (PDCCH); and
the method further comprises performing interference cancellation (IC) to cancel signals transmitted from the interfering base station when decoding the PDCCH.

58. The method of claim 57, further comprising:
signaling the serving base station of the UE capability of performing IC for physical downlink control channel (PDCCH).

59. The method of claim 58, further comprising reporting a channel condition of the PDCCH after the PDCCH IC is performed to the serving base station.

60. The method of claim 58, further comprising:
performing one or more radio link measurements on one or more non-special subframes of the serving base station based on the channel condition of the PDCCH after the PDCCH IC is performed; and
reporting the one or more radio link measurements to the serving base station.

61. The method of claim 52, wherein:
the assignment assigns uplink resources across more than one uplink subframe.

62. The method of claim 52, wherein the one or more respective configurable time offsets are conveyed with the assignment.

63. The method of claim 52, wherein:
the assignment of uplink resources is conveyed in an enhanced physical downlink control channel (E-PDCCH) using resources configured to avoid interference with transmissions from the interfering base station.

64. The method of claim 63, wherein the E-PDCCH is transmitted using resources selected to avoid interference using frequency domain resource partitioning between base stations.

65. The method claim 52, further comprising:
allocating downlink resources between the serving base station and interfering base station in the frequency domain;
wherein receiving the assignment of uplink resources includes receiving the assignment of uplink resources via a downlink resource allocated for the serving base station.

66. The method of claim 65, wherein:
allocating downlink resources includes allocating resources of a PDSCH;
wherein receiving the assignment of uplink resources via a downlink resource allocated for the serving base station includes receiving the assignment of uplink resources on an E-PDCCH via a resource allocated for the serving base station.

67. An apparatus for wireless communications, comprising:
means for receiving, from a serving base station, an assignment of uplink resources in a special subframe in which an interfering base station limits transmissions to reduce interference with transmissions from the serving base station, wherein the assigned uplink resources are in one or more subframes that are offset from the special subframe by one or more respective configurable time offsets and are offset relative to special subframes in which the interfering base station limits downlink transmissions in an effort to reduce interference to another station; and
means for transmitting to the serving base station, using the assigned uplink resources.

68. The apparatus of claim 67, wherein the special subframes comprise almost blank subframes (ABSs), in which the interfering base station limits its downlink transmission to reduce interference to another base station.

69. An apparatus for wireless communications, comprising:
at least one processor configured to:
receive, from a serving base station, an assignment of uplink resources in a special subframe in which an interfering base station limits transmissions to reduce interference with transmissions from the serving base station, wherein the assigned uplink resources are in one or more subframes that are offset from the special subframe by one or more respective configurable time offsets and are offset relative to special subframes in which the interfering base station limits downlink transmissions in an effort to reduce interference to another station; and
transmit to the serving base station, using the assigned uplink resources, and
a memory coupled to the at least one processor.

70. The apparatus of claim 69, wherein the special subframes comprise almost blank subframes (ABSs), in which the interfering base station limits its downlink transmission to reduce interference to another base station.

71. A non-transitory computer-readable medium comprising code for:
receiving, from a serving base station, an assignment of uplink resources in a special subframe in which an interfering base station limits transmissions to reduce interference with transmissions from the serving base station, wherein the assigned uplink resources are in one or more subframes that are offset from the special subframe by one or more respective configurable time offsets and are offset relative to special subframes in which the interfering base station limits downlink transmissions in an effort to reduce interference to another station; and
transmitting to the serving base station, using the assigned uplink resources.

72. The non-transitory computer-readable medium of claim 71, wherein the special subframes comprise almost blank subframes (ABSs), in which the interfering base station limits its downlink transmission to reduce interference to another base station.

73. A method for wireless communications, comprising:
transmitting, from a serving base station, an assignment of uplink resources in a special subframe in which an interfering base station limits transmissions to reduce interference with transmissions from the serving base station, wherein the assigned uplink resources are in one or more subframes that are offset from the special subframe by one or more respective configurable time offsets and are offset relative to special subframes in which the interfering base station limits downlink transmissions in an effort to reduce interference to another station; and
receiving at the serving base station, using the assigned uplink resources.

74. The method of claim 73, wherein the special subframes comprise almost blank subframes (ABSs), in which the interfering base station limits its downlink transmission to reduce interference to another base station.

75. The method of claim 73, wherein the assignment of uplink resources is based on a bitmap indicating one or more subframes which the interfering base station does not assign as uplink resources to one or more user equipments that are served by the interfering base station and can cause uplink interference to the interfered base station.

76. The method of claim 73, wherein:
the serving base station comprises a base station of a first power class; and
the interfering base station comprises a base station of a second power class.

77. The method of claim 76, wherein:
the serving base station comprises a pico-cell base station; and
the interfering base station comprises a macro-cell base station.

78. The method of claim 73, wherein:
transmitting the assignment of uplink resources includes transmitting the assignment of uplink resources in a physical downlink control channel (PDCCH),
wherein a user equipment (UE) performs interference cancellation (IC) to cancel signals transmitted from the interfering base station when decoding the PDCCH.

79. The method of claim 78, further comprising:
receiving, at the serving base station, signaling of the UE capability of performing IC for physical downlink control channel (PDCCH).

80. The method of claim 79, further comprising receiving from the UE a report regarding channel condition of the PDCCH after the PDCCH IC is performed by the UE.

81. The method of claim 79, further comprising:
receiving one or more radio link measurements from the UE, wherein the UE performs one or more radio link measurements on one or more non-special subframes of the serving base station based on the channel condition of the PDCCH after the PDCCH IC is performed.

82. The method of claim 73, wherein:
the assignment assigns uplink resources across more than one uplink subframe.

83. The method of claim 73, wherein the one or more respective configurable time offsets are conveyed with the assignment.

84. The method of claim 73, wherein:
the assignment of uplink resources is conveyed in an enhanced physical downlink control channel (E-PDCCH) using resources configured to avoid interference with transmissions from the interfering base station.

85. The method of claim 84, wherein the E-PDCCH is transmitted using resources selected to avoid interference using frequency domain resource partitioning between base stations.

86. The method claim 73, further comprising:
allocating downlink resources between the serving base station and interfering base station in the frequency domain;
wherein transmitting the assignment of uplink resources includes transmitting the assignment of uplink resources via a downlink resource allocated for the serving base station.

87. The method of claim 73, wherein:
allocating downlink resources includes allocating resources of a PDSCH;
wherein transmitting the assignment of uplink resources via a downlink resource allocated for the serving base station includes transmitting the assignment of uplink resources on an E-PDCCH via a resource allocated for the serving base station.

88. An apparatus for wireless communications, comprising:
means for transmitting, from a serving base station, an assignment of uplink resources in a special subframe in which an interfering base station limits transmissions to reduce interference with transmissions from the serving base station, wherein the assigned uplink resources are in one or more subframes that are offset from the special subframe by one or more respective configurable time offsets and are offset relative to special subframes in which the interfering base station limits downlink transmissions in an effort to reduce interference to another station; and
means for receiving at the serving base station, using the assigned uplink resources.

89. The apparatus of claim 88, wherein the special subframes comprise almost blank subframes (ABSs), in which the interfering base station limits its downlink transmission to reduce interference to another base station.

90. An apparatus for wireless communications, comprising:
at least one processor configured to:
transmit, from a serving base station, an assignment of uplink resources in a special subframe in which an interfering base station limits transmissions to reduce interference with transmissions from the serving base station, wherein the assigned uplink resources are in one or more subframes that are offset from the special subframe by one or more respective configurable time offsets and are offset relative to special subframes in which the interfering base station limits downlink transmissions in an effort to reduce interference to another station; and
receive at the serving base station, using the assigned uplink resources, and
a memory coupled to the at least one processor.

91. The apparatus of claim 90, wherein the special subframes comprise almost blank subframes (ABSs), in which the interfering base station limits its downlink transmission to reduce interference to another base station.

92. A non-transitory computer-readable medium comprising code for:
transmitting, from a serving base station, an assignment of uplink resources in a special subframe in which an interfering base station limits transmissions to reduce interference with transmissions from the serving base station, wherein the assigned uplink resources are in one or more subframes that are offset from the special subframe by one or more respective configurable time offsets and are offset relative to special subframes in which the interfering base station limits downlink transmissions in an effort to reduce interference to another station; and
receiving at the serving base station, using the assigned uplink resources.

93. The non-transitory computer-readable medium of claim 92, wherein the special subframes comprise almost blank subframes (AB Ss), in which the interfering base station limits its downlink transmission to reduce interference to another base station.

\* \* \* \* \*